United States Patent
Eto et al.

(10) Patent No.: US 7,768,532 B2
(45) Date of Patent: Aug. 3, 2010

(54) IMAGE PROCESSING SYSTEM, IMAGE PROCESSING METHOD, IMAGE PROCESSING PROGRAM, IMAGE PROCESSING APPARATUS, AND COMMUNICATION TERMINAL DEVICE

(75) Inventors: Masami Eto, Kawasaki (JP); Kyoko Ito, Kawasaki (JP); Yoshio Nishinaga, Kawasaki (JP); Takashi Ueki, Kawasaki (JP); Ryo Mizuguchi, Kawasaki (JP); Manabu Toyoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 704 days.

(21) Appl. No.: 11/277,791

(22) Filed: Mar. 29, 2006

(65) Prior Publication Data
US 2007/0146798 A1 Jun. 28, 2007

(30) Foreign Application Priority Data
Dec. 28, 2005 (JP) ............................. 2005-379368

(51) Int. Cl.
G09G 5/00 (2006.01)
H04N 9/68 (2006.01)
H04N 5/232 (2006.01)
G03G 13/00 (2006.01)

(52) U.S. Cl. ...................... 345/629; 348/234; 348/345
(58) Field of Classification Search ................. 345/629; 445/556.1; 348/234, 456
See application file for complete search history.

(56) References Cited

U.S. PATENT DOCUMENTS

| 6,577,760 B1 * | 6/2003 | Ohta et al. ................... 382/167 |
| 2004/0201741 A1 * | 10/2004 | Ban ........................ 348/231.3 |
| 2006/0114363 A1 * | 6/2006 | Kang et al. .................. 348/838 |
| 2006/0170669 A1 * | 8/2006 | Walker et al. ................ 345/418 |

FOREIGN PATENT DOCUMENTS

| JP | 2002-171497 |  | 6/2002 |
| JP | 2002-176547 | * | 6/2002 |
| JP | 2003-234830 |  | 8/2003 |
| JP | 2004-140590 |  | 5/2004 |
| WO | 2004/052035 A1 | * | 6/2004 |

* cited by examiner

Primary Examiner—Ryan R Yang
(74) Attorney, Agent, or Firm—Fujitsu Patent Center

(57) ABSTRACT

An image processing system combining images includes: a first communication terminal device (e.g., cellular phone) issuing a request for image composition and notifying address information of an acceptor of image provision; a second communication terminal device accepting the request of the image provision and transmitting an image (e g., cellular phone); and an image processing server receiving the request for the image composition from the first communication terminal device to register the notified address information, transmitting an inquiry about the image provision to the second communication terminal device with the use of the address information, receiving images and image control information transmitted from the communication terminal devices, creating a composite image with the use of the images, and adjusting the composite image based on the image control information.

6 Claims, 20 Drawing Sheets

41,42(~4N)

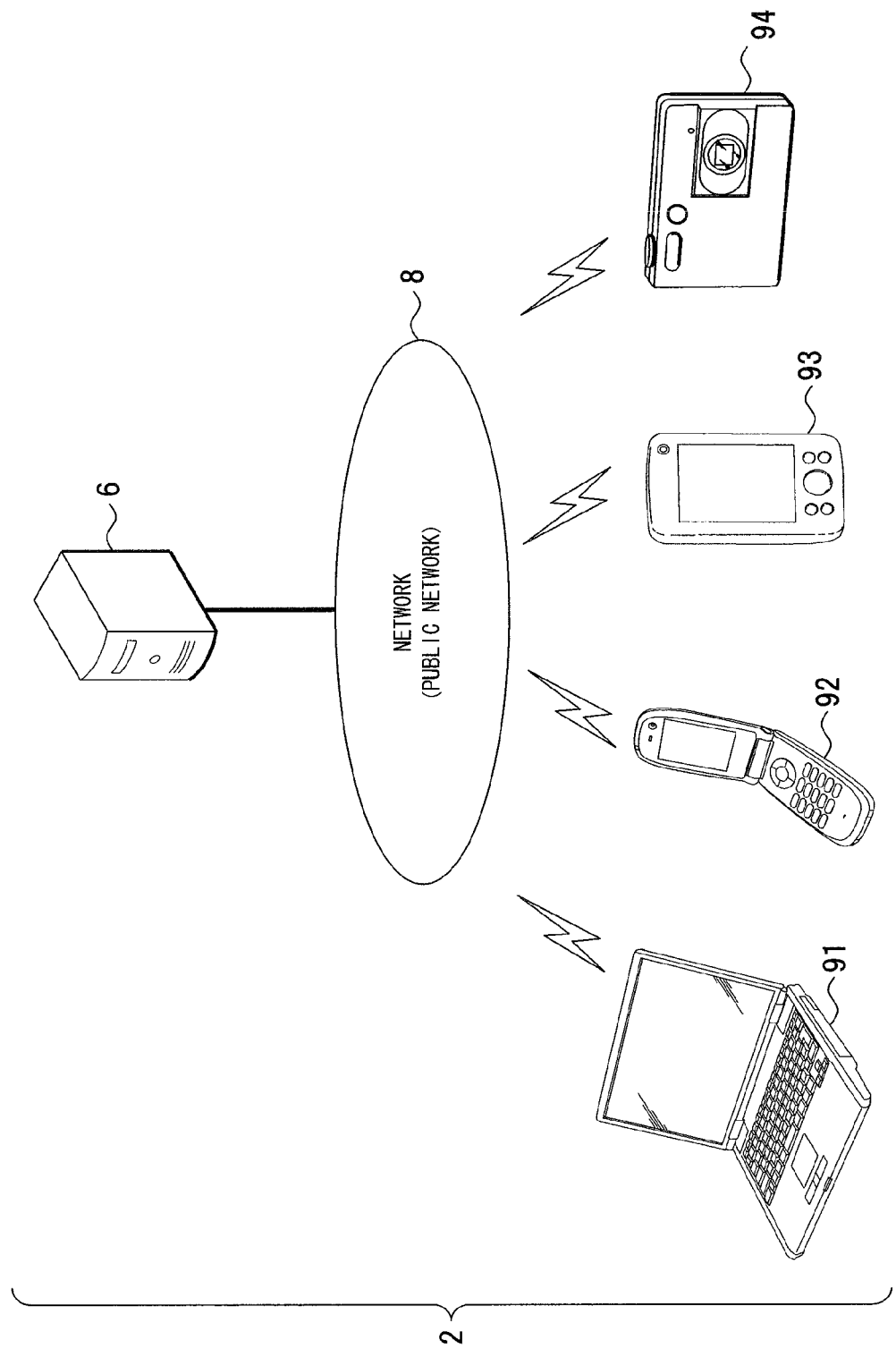

IMAGE PROCESSING SYSTEM, IMAGE PROCESSING METHOD, IMAGE PROCESSING PROGRAM, IMAGE PROCESSING APPARATUS, AND COMMUNICATION TERMINAL DEVICE

CROSS-REFERENCE TO RELATED APPLICATIONS

This application is based upon and claims the benefit of priority from the prior Japanese Patent Application No. 2005-379368, filed on Dec. 28, 2005, the entire contents of which are incorporated herein by reference.

BACKGROUND OF THE INVENTION

1. Field of the Invention

The present invention relates to an image process such as composition of images transmitted from a communication terminal device such as a portable terminal including a photographing function and a communication function, and relates to an image processing system, image processing method, image processing program, image processing apparatus, and communication terminal device used in the image process.

2. Description of the Related Art

With regard to the image composition that synthesizes a single image by overlapping a plurality of images, conventionally, a composite image system is known which combines images from a plurality of users on a server. This composite image system collects and combines images owned individually by the plurality of users on a server. The image composition enables presentation, expression, etc. beyond individual images.

The image composition includes: a composite image system constituted by a cellular phone, a video telephone device, and a server connected thereto via communication lines, which combines images photographed by a user in the server, which transmits the composite image to the cellular phone, the video telephone device, etc., and which combines the images again in the server after the image are transmitted again by the user who watch the composite image (Japanese Patent Application Laid-Open Publication No. 2002-176547 (paragraph No. 0010, FIG. 2, etc.)); an image composition system using a plurality of cellular phones capable of acquiring image information such as camera cellular phones, which switches from a phone-call mode to an image composition mode while maintaining communication between the cellular phones to perform image composition on each cellular phone (Japanese Patent Application Laid-Open Publication No. 2002-171497 (paragraph No. 0018, FIG. 2, etc.)); an image photographing system, which registers a background image to a database through a line using a cellular phone, and which combines the background image and a photographed image for transmission to the cellular phone (Japanese Patent Application Laid-Open Publication No. 2003-234830 (paragraph No. 0004, FIG. 2)); an image composition method, which stores template data into a storage medium of an image composition server, which transmits image data acquired by a camera cellular phone to the image composition server to combine the image data with the template data, and which acquires the composite image data from the cellular phone (Japanese Patent Application Laid-Open Publication No. 2004-140590 (paragraph Nos. 0019, 0020, FIG. 3, etc.)), etc.

As disclosed in Japanese Patent Application Laid-Open Publication Nos. 2002-176547, 2002-171497, 2003-234830, and 2004-140590, to synthesize a single image from a plurality of images, an editing process is needed, such as transferring each image to a location of synthesis and overlapping images. When a process is performed for transferring an image to a synthesis server after photographing the image, if the provided image does not match the purpose of the composite image, the provider is requested to photograph an image again and, therefore, a process for acquiring an optimum composite image is cumbersome and time-consuming. If photographing conditions are not the same such as when a distance from an object to a photographing lens is different, a difference is made in the provided image, which causes trouble such that in the case of an image of a person, a height is changed or an actual constitution is altered due to a scale ratio. This results in a composite image different from a real image. If the rephotographed image does not conform to the composite image, an image must be photographed again.

However, Japanese Patent Application Laid-Open Publication Nos. 2002-176547, 2002-171497, 2003-234830, and 2004-140590 do not disclose or indicate such a problem and do not have a configuration or idea for solving the problem.

SUMMARY OF THE INVENTION

The object of the present invention relates to image composition and is to realize intended image composition by linking an image provider with the image composition.

More particularly, the object is to facilitate image modification on the image provider side and the image composition side to increase a degree of freedom in the image composition.

In order to achieve the above object, according to a first aspect of the present invention there is provided an image processing system that combines images, comprising a first communication terminal device that issues a request for image composition, the first communication terminal device notifying address information of an acceptor of image provision; a second communication terminal device that accepts an inquiry about the image provision to transmit an image; and an image processing server that receives the request for the image composition from the first communication terminal device as well as registers the notified address information, the image processing server transmitting the inquiry about the image provision to the second communication terminal device with the use of the address information, the image processing server receiving an image and image control information transmitted from the communication terminal devices, the image processing server creating a composite image with the use of the image as well as adjusting the composite image based on the image control information.

In such a configuration, the request of the image composition and the address information of the image provision accepter are notified from the first communication terminal device to the image processing server. When receiving this notification, the image processing server inquires whether the image can be provided to the address or not; the second communication terminal device responds to this inquiry; and an image and image control information is provided from the second communication terminal that can provide the image, to the image processing server. The first communication terminal device requesting the image composition also provides an image and the image control information. The image processing server combines these images to create the composite image and the composite image is adjusted based on the image control information. The provided images may be any images such as images that have been photographed, images that are being photographed, etc.

To achieve the above object, in the image processing system: the images provided to the image processing server may be an image that is being photographed; the image processing server may display the composite image on an image display area accessible from the first communication terminal device or the second communication terminal device; the images may be transmitted periodically or continuously from the first communication terminal device or the second communication terminal device to the image processing server or the image processing server may periodically or continuously receive the images transmitted from the first communication terminal device or the second communication terminal device; the image processing server may provide the image display area accessible from the first communication terminal device or the second communication terminal device and may enable the communication terminal devices to photograph an object correspondingly to a common background image on the image display area; the image processing server may adjust the image by transmitting to the first communication terminal device or the second communication terminal device the image control information for adjusting the image for using any one of a plurality of images transmitted from the first communication terminal device or the second communication terminal device as a basis for adjusting another image; the image processing server may adjust the image used for the image composition with the image control information transmitted from the first communication terminal device or the second communication terminal device; with the image control information transmitted from the first communication terminal device or the second communication terminal device, the image processing server may use the image provided from the first communication terminal device or the second communication terminal device as a basis for adjusting another image; and the first communication terminal device or the second communication terminal device may adjust the image based on the image control information transmitted from the image processing server and may transmit the image to the image processing server.

In order to achieve the above object, according to a second aspect of the present invention there is provided an image processing method for combining images, comprising the processes of receiving a request for image composition from a first communication terminal device to register address information of an acceptor of image provision; transmitting an inquiry about the image provision to a second communication terminal device with the use of the address information; receiving an image and image control information transmitted from the communication terminal devices; and creating a composite image with the use of the received image as well as adjusting the composite image based on the image control information. As described above, in the image processing method, by transmitting a request for the image composition from the communication terminal device and by receiving the request, it is inquired to the image provision accepter whether the image can be provided or not; the image and the image control information are provided from the communication terminal device acceding to the image composition; the image composition is performed with the image; and the composite image is adjusted by the image control information. As described above, the provided image may be not only an image that is being photographed but also a stored image in a storage unit, etc.

In order to achieve the above object, according to a third aspect of the present invention there is provided an image processing program that allows a computer to combine a plurality of image, comprising the steps of receiving a request for image composition from a first communication terminal device to register address information of an acceptor of image provision; transmitting an inquiry about the image provision to a second communication terminal device with the use of the address information; receiving an image and image control information transmitted from the communication terminal devices; and creating a composite image with the use of the received images as well as adjusting the composite image based on the image control information. According to such an image processing program, the aforementioned image processing method is realized by information process of a computer.

In order to achiever the above object, according to a fourth aspect of the present invention there is provided an image processing apparatus that combines images, comprising a communicating unit that communicates with a first communication terminal device issuing a request for image composition as well as specifying an acceptor of image provision or with a second communication terminal device accepting an inquiry of the image provision to transmit an image; a registering unit that registers address information notified from the first communication terminal device; and a processing unit that receives the request for the image composition from the first communication terminal device to transmit the inquiry about the image provision through the communicating unit with the use of the address information registered in the registering unit, the processing unit creating a composite image with the use of the images provided from the communication terminal devices as well as adjusting composite image based on the image control information provided from the communication terminal devices.

The image processing apparatus with such a configuration corresponds to the aforementioned image processing server. That is, the image processing apparatus inquires the second communication terminal device whether the image for the image composition can be provided or not, in response to the request for the image composition and the notification of the address information of the second communication terminal device that should participate in the image composition, which are received from the first communication terminal device. The image and the image control information are provided; the image composition is performed with the image; and the composite image is adjusted with the image control information.

In order to achiever the above object, according to a fifth aspect of the present invention there is provided a communication terminal device that provides an image used in image composition, comprising an image acquiring unit that acquires the image used in the image composition; and a communicating unit that notifies an image processing server combining images of address information of a communication terminal device that is an acceptor accepting to provide an image necessary for the image composition, the communicating unit transmitting the image acquired by the image acquiring unit and image control information.

According to such a configuration, the communication terminal device acquires the image necessary for the image composition with the image acquiring unit. The image acquiring unit may be a camera unit that photographs and acquires the image or may be other configurations for capturing the image necessary for the image composition. The communication terminal device corresponds to the aforementioned first communication terminal device, and the communicating unit notifies the address information of the communication terminal device of the accepter that provides the image necessary for the image composition, and transmits the image acquired with the image acquiring unit and the image control information. The aforementioned image processing apparatus, image processing server, or image processing system can use such a communication terminal device to form the composite image and can adjust the composite image with the image control information to acquire the desired composite image.

To achieve the above object, the communication terminal device may include an image processing unit that adjusts the image with the use of the image control information provided from the image processing server and may transmit the adjusted image to the image processing server with the communicating unit; the communication terminal device may include a displaying unit that adjust the image with the image control information provided from the image processing server to display the image in case where the image conforms to the image control information; the communication terminal device may include a photographing unit that photographs the image used for the image composition, and a communicating unit that communicates with the image processing server performing the image composition to receive inquiry about provision of the image necessary for the image composition, to notify the image processing server of the information representing whether the provision can be performed or not, and to transmit the image photographed with the photographing unit to the image processing server in case where the provision of the image is accepted; and the communication terminal device may include an image processing unit that adjusts the image with the use of the image control information provided from the image processing server and may transmit the adjusted image to the image processing server with the communicating unit.

The features and the advantages of the present invention are listed as follows.

According to the present invention, since the image and the image control information can be provided through the communication terminal device to form the composite image using the image and to adjust the composite image using the image control information, the composite image reflecting the intension of the image provider can be acquired and the composite image can be acquired by the communication terminal device.

The other objects, features, and advantages of the present invention will become more apparent from the following detailed description of the embodiments with reference to the accompanying drawings.

BRIEF DESCRIPTION OF THE DRAWINGS

FIG. 20 shows an image processing system according to a fourth embodiment;

DETAILED DESCRIPTION OF THE PREFERRED EMBODIMENTS

First Embodiment

Figure 1:
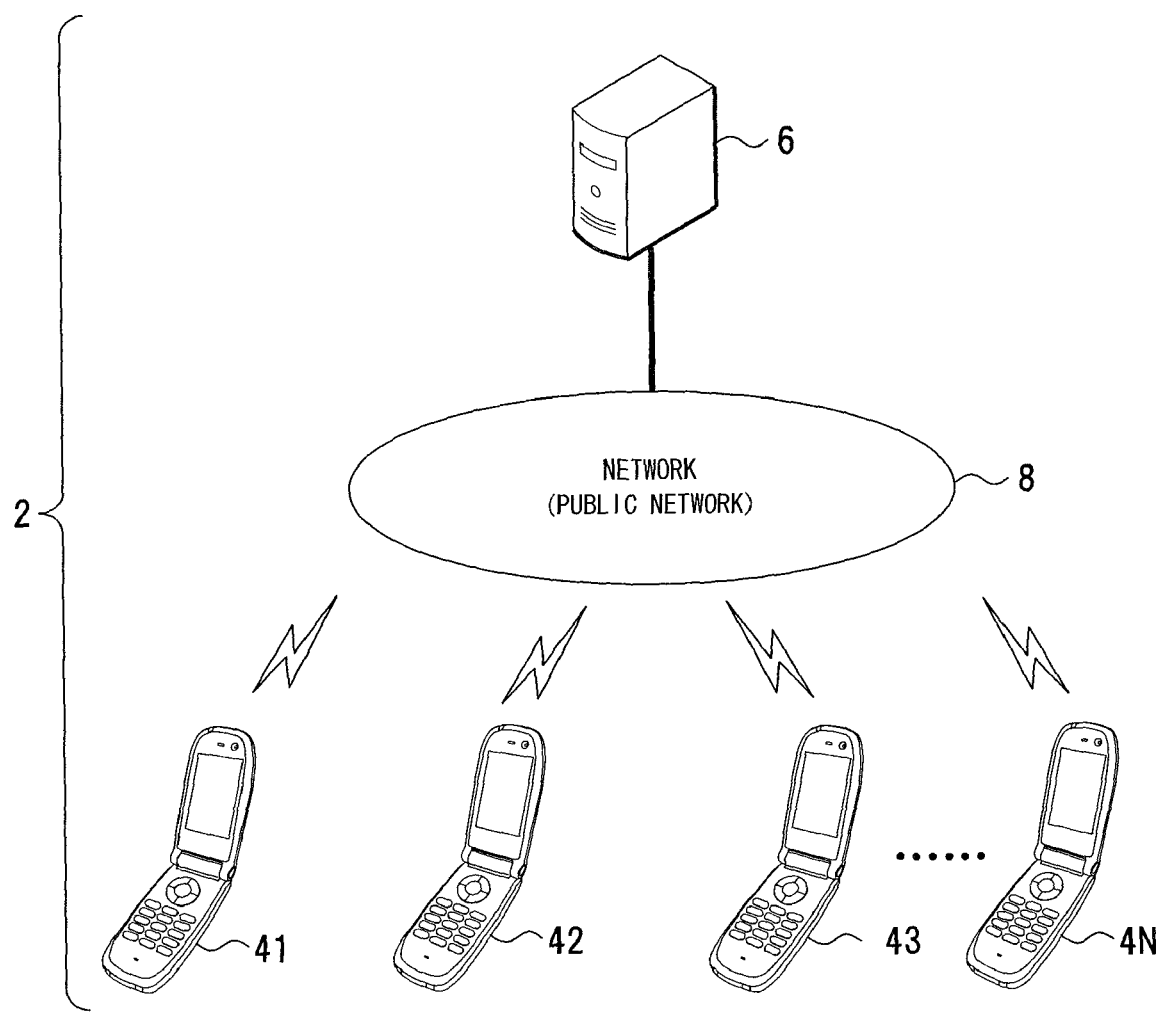
FIG. 1 shows an example of an image processing system.

Description will be made of an image processing system according to a first embodiment of the present invention with reference to FIG. 1. FIG. 1 shows an example of an image processing system.

As shown in FIG. 1, this image processing system 2 includes a communication function and a photographing function and is provided with, for example, cellular phones 41, 42, 43 . . . 4N that are first communication terminal devices requesting the image composition or second communication terminal devices requested to provide images for the image composition. For example, when the cellular phone 41 issues a request for the image composition, this cellular phone 41 is the first communication terminal device and other cellular phones 42 to 4N are the second communication terminal devices. For the cellular phones 41, 42, 43 . . . 4N, for example, an image processing server 6 is installed which acts as an image processing apparatus, and the cellular phones 41, 42, 43 . . . 4N and the image processing server 6 are connected over network 8 such as public network. The image processing server 6 is constituted by, for example, a computer and includes functions associated with a image process, such as a communication function mediated by the network 8, etc., a storage function for photographed images provided by photographing, a registration function for address information such as mail addresses, a function for notification and inquiry, a function for combining an image with a template, and a function for notifying an image provider of correction information for images and photographing conditions, for example.

In such a configuration, an image composition requester (hereinafter, "requester") uses the cellular phone 41 to notify the image processing server 6 of a request for the image composition and, for example, the mail addresses of the cellular phones 42, 43, which are address information of users participating in the image composition. The image processing server 6 registers the notified mail addresses and allows the requester to select a template that is a background image prepared in advance. The image processing server 6 transmits a mail to the mail addresses to elicit participation in the image composition an to inquire about participation in the image composition. The user participating in the image composition is an image provision accepter (hereinafter, "accepter"). If someone participates in the image composition, URL (Uniform Resource Locator) of image display Web (World Wide Web), i.e., an image display area is notified from the image processing server 6 to the cellular phones 41, 42, 43 through mail transmission, etc.

When each cellular phone 41, 42, 43 photographs and acquires an image and transmits the image to the image processing server 6 along with image control information such as brightness and a focal distance, the image processing server 6 uses the image to create a composite image and displays the composite image at the aforementioned URL. The cellular phones 41, 42, 43, notified of the notification of the URL checks the display; if a correction is needed, the composite image is corrected in the image processing server 6 or the cellular phones 41 to 4N with the use of the image control information; after the corrected composite image is displayed and confirmed, the image can be loaded into the cellular phones 41 to 4N.

When the composite image is created in this way, the acquired composite image can be an image intended by the user participated in the image composition or a unified composite image corrected with the image control information, and the image composition enables presentation, expression, etc. beyond individual images.

Figure 2:
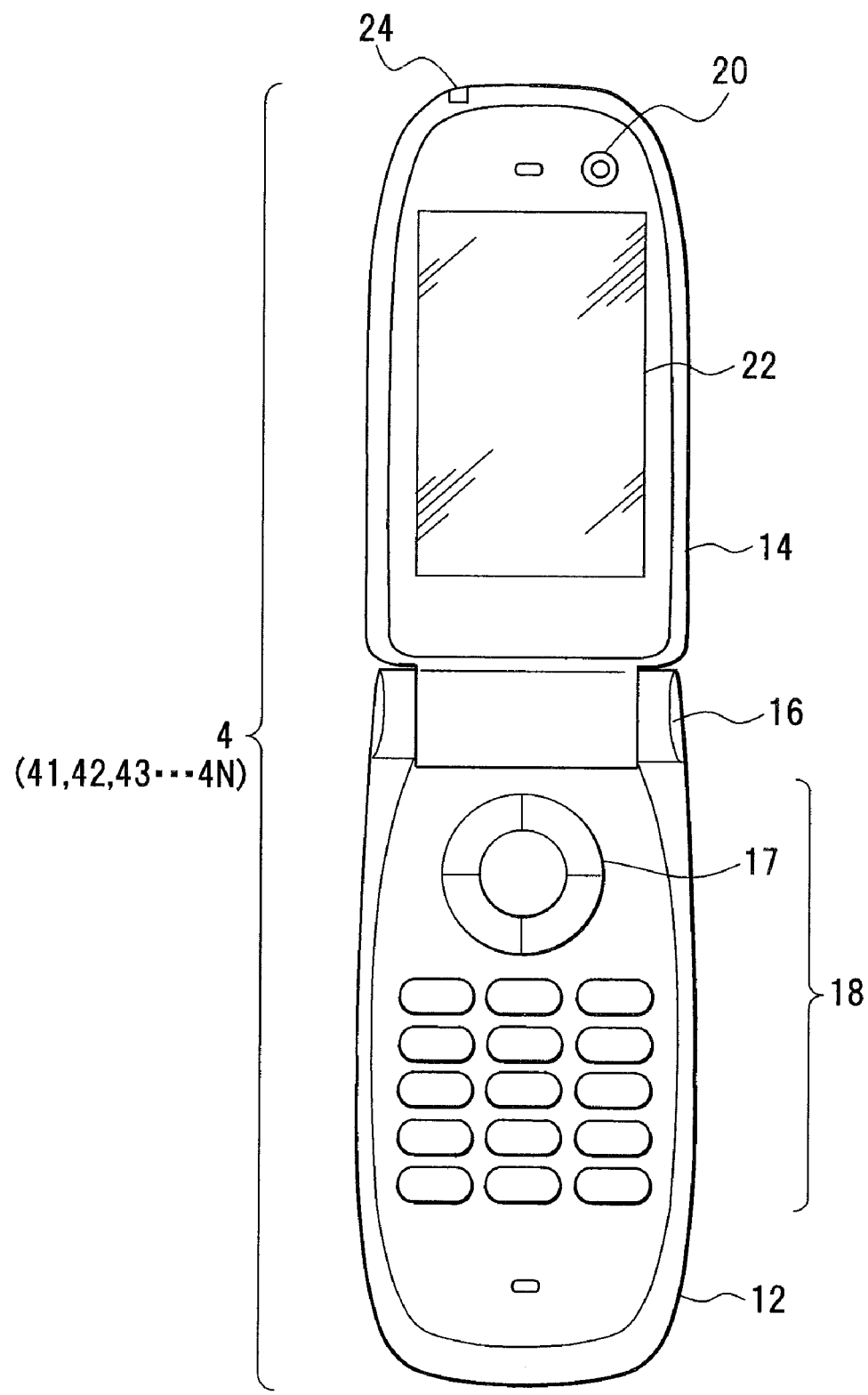
FIG. 2 shows an example of an external form of a cellular phone.
Figure 3:
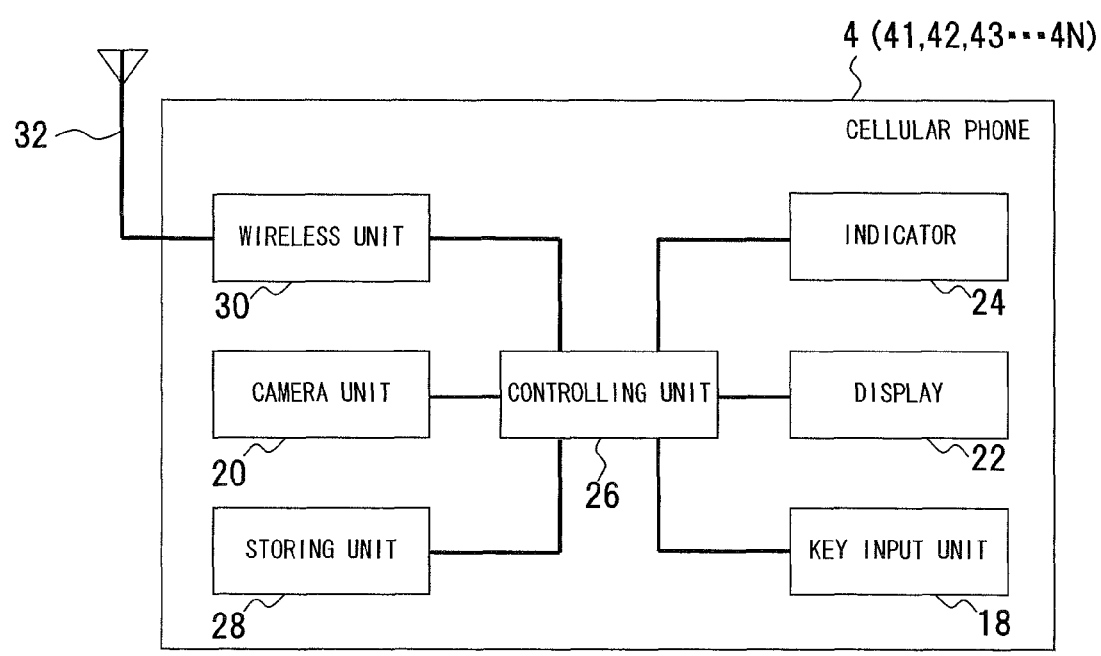
FIG. 3 is a block diagram of a hardware configuration example of the cellular phone.

Description will be made of a configuration of the cellular phones 41 to 4N in the image processing system 2 with reference to FIGS. 2 and 3. FIG. 2 shows an example of an external form of the cellular phone and FIG. 3 is a block diagram of a hardware configuration example of the cellular phone. In FIGS. 2 and 3, the same symbols are added to the portions corresponding to those of FIG. 1.

A cellular phone 4 is used as the cellular phones 41 to 4N in the image processing system 2; the cellular phone 4 is constituted by, for example, two housing units 12, 14 coupled with a hinge unit such that the cellular phone 4 can be opened and closed; and the housing unit 12 is provided with a decision key 17 used as a cursor key, a shutter, etc., a key input unit 18 composed of a plurality of keys such as a numeric key, etc. The key input unit 18 is used for information input such as photographing, phone numbers of communication partners, URL input, instructions for transmitting images, etc. The housing unit 14 is provided with a camera unit 20 that is an image acquiring unit, a display 22, an indicator 24, etc. The camera unit 20 may be installed not only on the front side of the housing unit 14 but also the back side of the housing unit or may be installed on the both sides. The display 22 is constituted by, for example, LCD (Liquid Crystal Display) and displays images photographed by the camera unit 20, input information from the key input unit 18, etc. The indicator 24 is constituted by, for example, LED (Light Emitting Diode) display device, is used for indicating that communication is in process, and is lighted to notify that a predetermined focal distance is achieved in photographing mode.

As shown in FIG. 3, the cellular phone 4 is provided with a controlling unit 26, a storing unit 28, a wireless unit 30, an antenna 32, etc. along with the key input unit 18, the camera unit 20, the display 22, and the indicator 24 described above. The controlling unit 26 is constituted by, for example, CPU (Central Processing Unit), etc. and executes various processes for the image composition such as the communication function and the photographing function described above. The storing unit 28 is constituted by a storage medium such as ROM (Read-Only memory) and RAM (Random-Access Memory) and stores various control programs such as an image processing program for executing the process of the controlling unit 26 such as CPU as well as various types of information such as templates, images, image information, and information that is partially processed. The storing unit 28 also stores images that are being photographed. A database of various data is constituted by the storing unit 28. In addition to the ROM and the RAM, the storing unit 28 may be constituted by an external recording medium such as a ROM card that can be loaded into and removed from the housing unit 12, etc.

The wireless unit 30 performs wireless communication with a base station connected through the network 8 to give and receive various piece of information such as voice, images, text information to/from the image processing server 6 through the network 8 in this wireless communication. In this case, for example, radio waves are used for giving and receiving the images and the photographing information to/from the image processing server 6 and the radio waves are transmitted or received with the antenna 32.

In such a configuration, the camera operation can be performed either in a non-communication mode or communication mode and the image can be transmitted either during the photographing or after the photographing. The stored images can be transmitted by using an attached file when a mail is transmitted, for example. The transmitted image and the photographing conditions thereof are displayed on the display 22 and can be checked by a user.

With regard to the process for the aforementioned image composition, the operations of the requester and the accepter of the image composition are as follows.

(1) Communication is established to access the image processing server 6; a template in the image processing server 6 is selected; and the image processing server 6 is notified of the mail addresses of users allowed to participate in the image composition.

(2) The URL of the image display Web transmitted from the image processing server 6 is received to access the image display Web.

(3) When accessing the image display Web, an image in photographing process is transmitted to the image processing server 6 and the image in photographing process is transmitted periodically or continuously to the image processing server 6.

(4) A composite image displayed on the image display Web is acquired to check whether the composite image is an intended image or not, and if the composite image should be corrected, an adjustment instruction is transmitted. This adjustment includes changes in the photographing conditions, image correction, rephotographing of the image, etc.

(5) To unify the image brightness such as the amount of sunlight and the photographing conditions such as the direction of the object, a feedback instruction from the image processing server 6 is received. The feedback instruction is also received from the image processing server 6 with regard to the photographing condition such as a size and scale of the object, etc.

(6) After checking the composite image, the requester or the accepter can press down the shutter assigned to the decision key 17 in the key input unit 18 to confirm the composite image.

(7) The confirmed composite image is displayed on the display 22 of the cellular phone 4 and is stored in the storing unit 28 by pressing down the decision key 17 in the key input unit 18.

Figure 4:
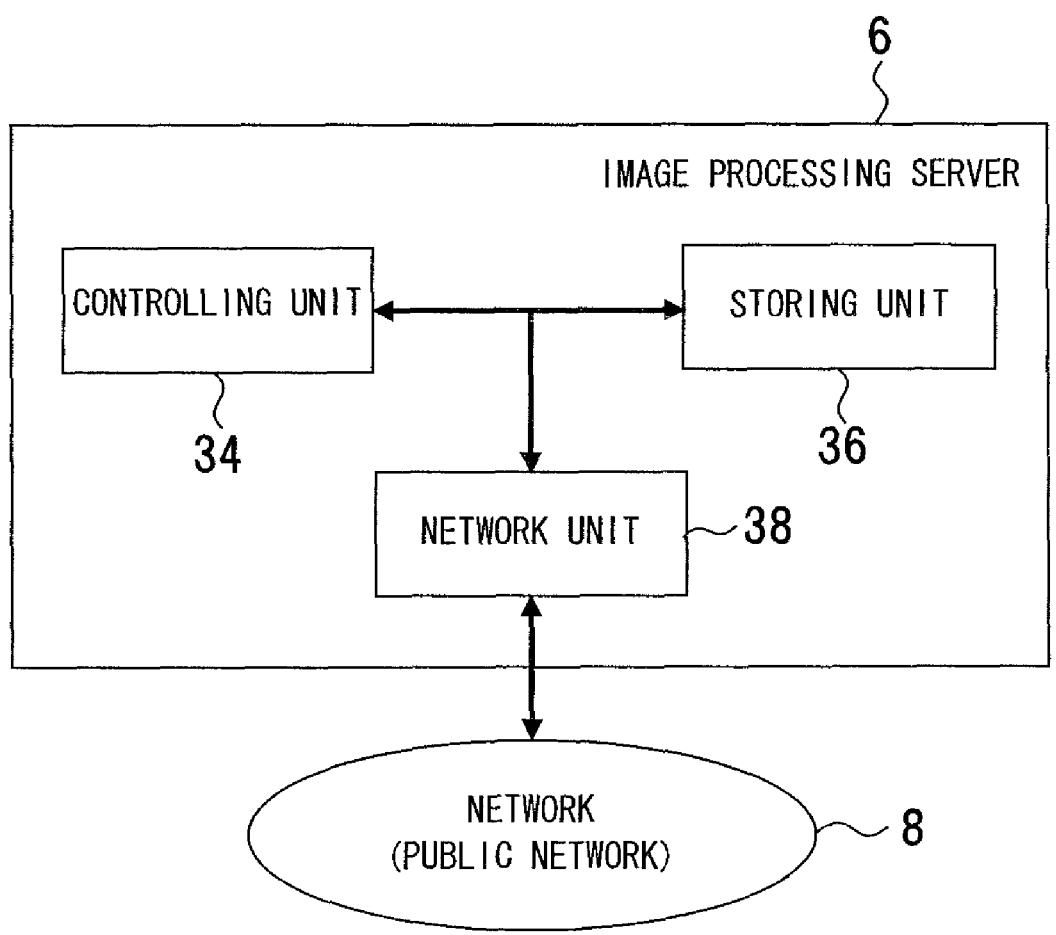
FIG. 4 is a block diagram of a hardware configuration example of an image processing server.

Description will be made of the image processing server 6 in the image processing system 2 with reference to FIG. 4. FIG. 4 is a block diagram of a hardware configuration example of the image processing server 6. In FIG. 4, the same reference numerals are imparted to the same portions as those of FIG. 1.

The image processing server 6 is constituted by a computer with a communication function and includes a controlling unit 34, a storing unit 36, a network unit 38, etc., for example. The controlling unit 34 is constituted by, for example, CPU, etc. and includes functions associated with the image composition, such as a communication function mediated by the network 8, etc., an accumulation function for photographed images provided by photographing, a registration function for address information such as mail addresses, a function for notification and inquiry, a function for combining an image with a template, a function for notifying an image provider of correction information for images and photographing conditions, a function for displaying images on the aforementioned image display Web, and a function for notifying the URL thereof, for example. That is, the controlling unit 34 constitutes an image processing unit that executes image processes such as the image composition, adjustment of the composite image, etc.

The storing unit 36 is constituted by a storage medium such as ROM and RAM and stores various control programs such as an image processing program for executing the process of the controlling unit 34 such as CPU as well as the aforementioned various types of information such as templates, images, image information, information that is partially processed, and the mail addresses of the image provision accepters. That is, the storing unit 36 constitutes a registering unit that registers the address information. A database of various data is constituted by the storing unit 36. In addition to the ROM and the RAM, the storing unit 36 may be constituted by an external recording medium such as a removable ROM card. The network unit 38 is connected to the aforementioned network 8 and executes the communication function under the control of the controlling unit 34 to give and receive information to/from the aforementioned cellular phones 41 to 4N.

With regard to the aforementioned image composition, the image process of the image processing server 6 is as follows.

(1) A template is selected which is a background image used in the image composition.

(2) To register the accepter of the image composition, the storing unit 36 constituting the registering unit registers the mail address notified from the cellular phone 41, for example.

(3) The URL representing the image display Web is transmitted to the requester and the accepter.

(4) The cellular phone 4 corresponding to the notified mail address is permitted to access the established image display Web, and the cellular phone 4 captures an image that is being photographed by the cellular phone 4. In this case, the image in the photographing process is captured periodically or continuously.

(5) Each received image is combined with the template to form a composite image.

(6) The composite image is displayed on the image display Web; adjustment requests such as image corrections are accepted by accessing from the cellular phone 4 corresponding to the mail address; the corrected composite image is displayed.

(7) The cellular phone 4 is notified of changes in the photographing conditions, which are the feedback instruction.

(8) In response to the confirmation instruction for the composite image, the confirmed composite image is displayed on the image display Web.

Figure 5:
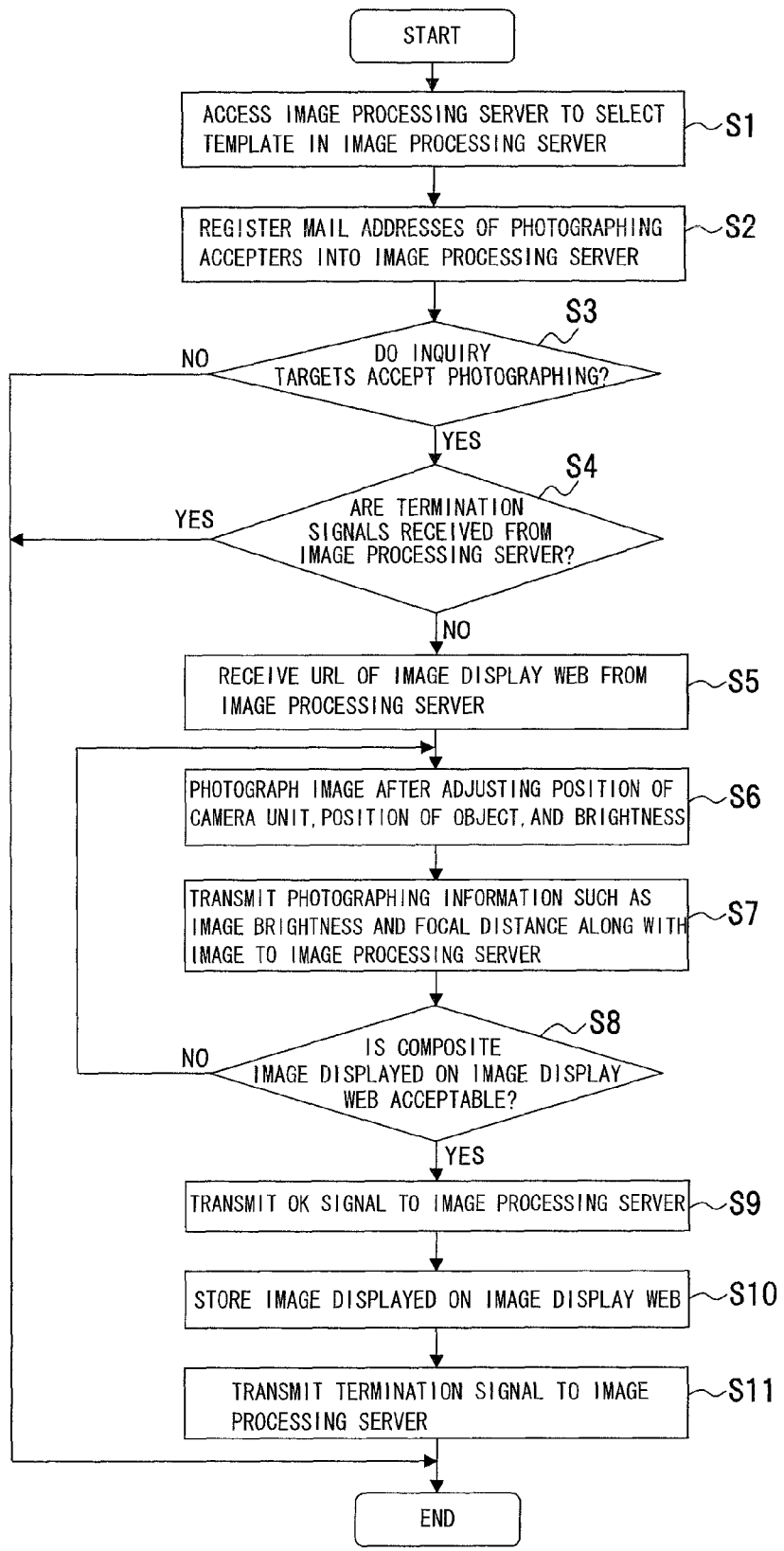
FIG. 5 is a flowchart of a process procedure of an image processing program in the cellular phone (requester)

Description will be made of a cellular phone (requester) image processing method with reference to FIG. 5. FIG. 5 is a flowchart of a process procedure of the image processing program in the cellular phone (requester).

It is assumed that a user of the cellular phone 41 (FIG. 1) is a requester. In this case, the image composition process is requested from the cellular phone 41 to the image processing server 6.

By establishing communication between the cellular phone 41 and the image processing server 6 through the network 8 to access the image processing server 6, for example, a template 50 (FIG. 10) is selected from a few types of background information in the image processing server 6 (step S1). In this case, the mail addresses of the photographing accepters are notified and registered into the image processing server 6 (step S2). The mail addresses may include the mail address of the requester.

To the mail address, the image processing server 6 requests to photograph an image (to participate in the image composition) and the results of the inquiry are notified from, for example, the cellular phone 42, etc. of the acceptors to the cellular phone 41 of the requester. It is checked whether or not the inquiry targets accept to photograph an image (step S3), and if no inquiry target at the registered mail address accepts to photograph an image (if refused) (step S3, NO), the image composition process is terminated. If accepting to photograph an image (step S3, YES), the inquiry target at the mail address becomes the photographing acceptor (image provider). It is checked whether or not a termination signal indicating termination of the image composition is received from the image processing sever 6 (step S4) and if the termination signal is received (step S4, YES), the image composition process is terminated. If the signal is not received (step S4, NO), the image composition process is continued and the cellular phone 41 receives the URL of the image display Web notified from the image processing server 6 (step S5) and registers the URL.

In the cellular phone 41, after adjustments are performed for the position of the camera unit 20, the position of the object, brightness, etc., the photographing is performed (step S6). Along with the image acquired in this photographing, the image control information, i.e., the photographing information such as the image brightness and focal distance is transmitted to the image processing server 6 (step S7). Similarly, the images and the photographing information are notified from the cellular phone 42, etc. accepting to photograph; the image composition is performed to combine these images with the template; and the composite image is displayed on the image display Web.

In the cellular phone 41, it is checked whether the composite image displayed on the image display Web is permitted or not (step S8), and if the image is corrected (step S8, NO), the processes of steps S6, S7 are performed again to make the image processing server 6 correct the image displayed on the image display Web. If the composite image displayed on the image display Web is permitted (step S8, YES), a permission signal, i.e., an OK signal is transmitted to the image processing server 6 (step S9). When receiving the OK signal, the image processing server 6 fixes the displayed image. The image displayed on the image display Web is stored in the cellular phone 41 (step S10). The image composition is completed with this storage. The requester transmits the aforementioned termination signal to the image processing server 6 through the cellular phone 41 (step S11). In response to this signal, the image processing server 6 terminates the image process.

Figure 6:
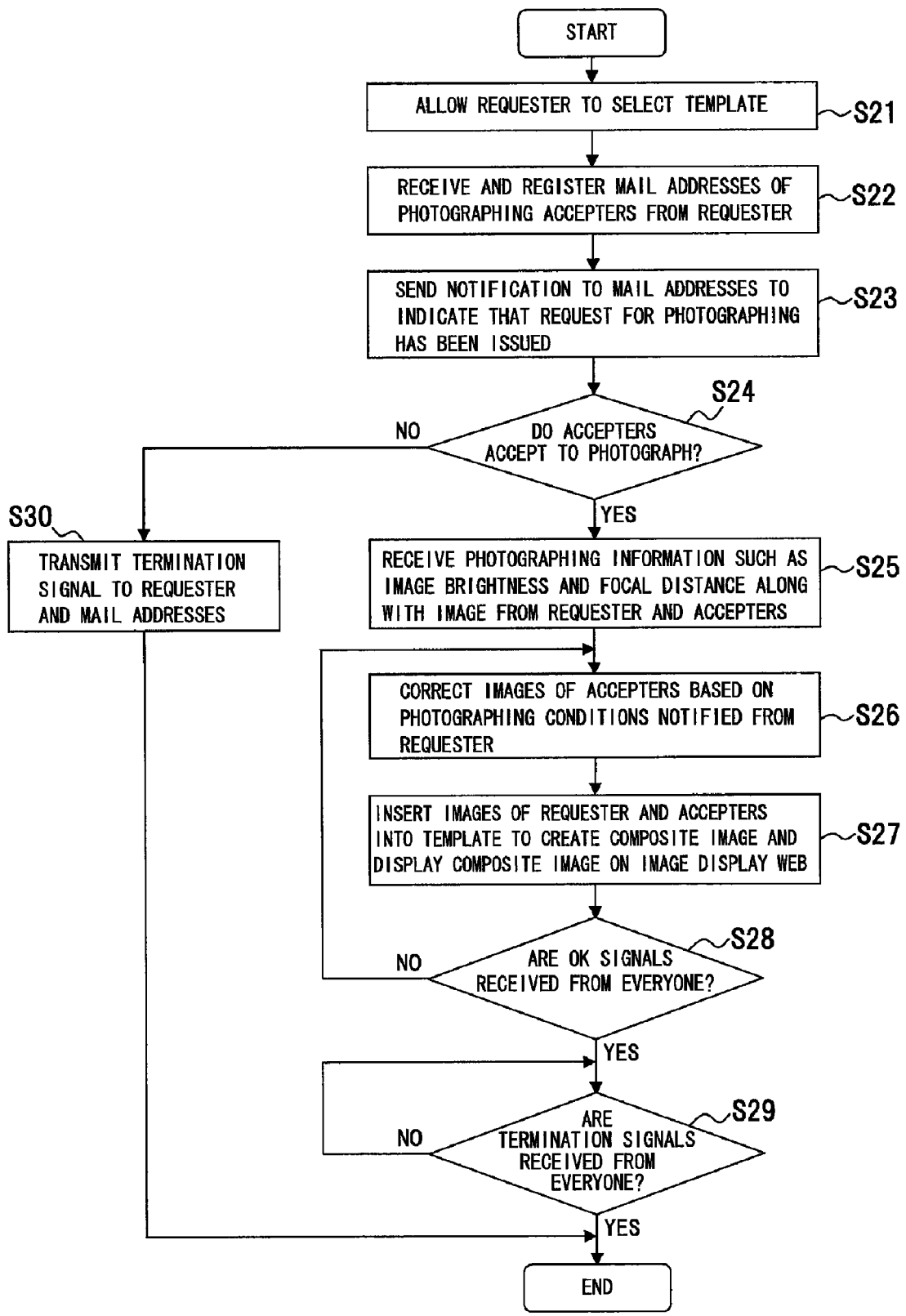
FIG. 6 is a flowchart of a process procedure of an image processing program in the image processing server.

Description will be made of an image processing method of the image processing server 6 with reference to FIG. 6. FIG. 6 is a flowchart of a process procedure of an image processing program in the image processing server 6.

The image processing server 6 processes the request for the image composition from the requester, the mail addresses of the inquiry targets, the selection of the template, the images and the photographing information such as the photographing condition, the reception of the termination signal, etc., the inquiry to the registered mail addresses, the images and the photographing information from the accepters, the reception of the termination signal, etc., the image composition and the display thereof, etc.

In the image processing server 6, the template 50 (FIG. 10) is selected by the requester (step S21). After the template is selected, the mail addresses of the accepters transmitted from the requester are received and registered (step S22). Notification to the mail addresses is performed to indicate that the request for photographing has been issued by the requester (step S23).

The image processing server 6 checks whether or not the accepters accept to photograph for the notification of the request for photographing (step S24). If the accepters accept to photograph (step S24, YES), the images are received from the accepters and the requester along with the photographing information such as the brightness and the focal distances of the images (step S25).

Based on the photographing information such as the brightness and the focal distance of the image notified from the requester, the image processing server 6 corrects the images from the accepters (step S26). That is, the composite image is created by inserting the images from the requester and the accepters into the template, and the composite image is displayed on the image display Web of the image processing server 6 (step S27).

The composite image displayed on the image display Web is accessed and checked by the requester and the accepters, and it is determined by the requester and the accepters whether the composite image is accepted or not. Since permission signals (OK signals) are transmitted to instruct to fix the image if the requester and the accepters accept the image, the image processing server 6 monitors whether or not the OK signals are received from the requester and all the accepters (step S28). If the OK signals are not received (step S28, NO), the processes of steps S26, S27 are repeated until the OK signals are received. As a result, the composite image accepted by the requester and all the accepters is created and displayed on the image display Web. If the OK signals are received from the requester and all the accepters (step S28, YES), it is similarly checked whether or not the termination signals are received from everyone (step S29); the image processing server 6 waits until the termination signals are received from everyone (step S29, NO); and if the termination signals are received from everyone (step S29, YES) this process is terminated.

When the targets at the mail addresses are requested to photograph images, if the photographing is not accepted by any accepter (step S24, NO), the termination signals are transmitted to the requester and the accepters (step S30) and the image composition process is terminated as well.

Figure 7:
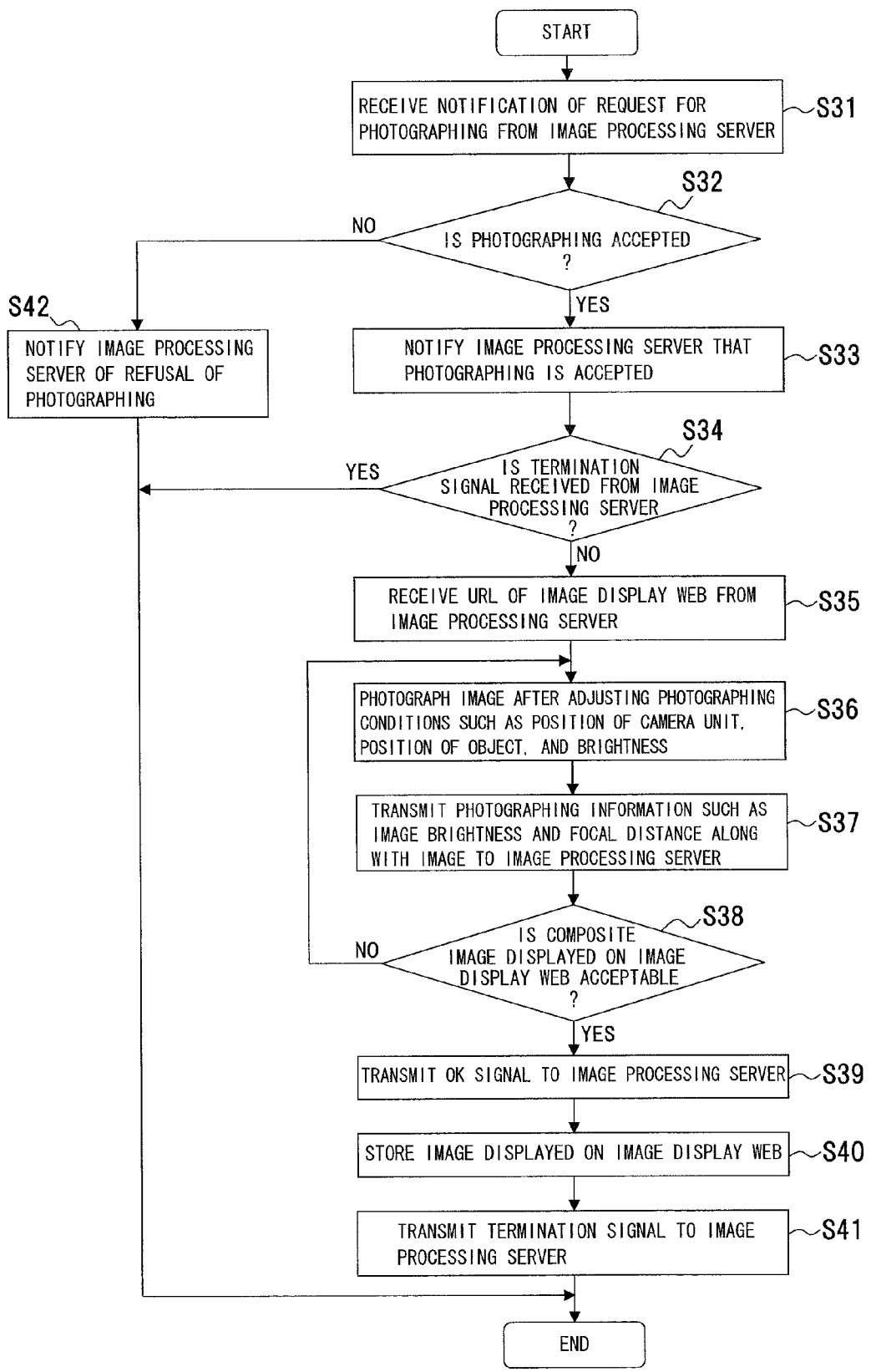
FIG. 7 is a flowchart of a process procedure of an image processing program in the cellular phone (accepter)

Description will be made of an image processing method in the cellular phone (accepter) with reference to FIG. 7. FIG. 7 is a flowchart of a process procedure of the image processing program in the cellular phone (accepter).

To facilitate the description, the cellular phone 42 is taken as an example when the users of the cellular phones 42 to 4N are the accepters.

The cellular phone 42 receives the notification of the request for the photographing from the image processing server 6 (step S31). In response to this notification of the request for the photographing, it is determined whether the photographing is accepted or not (step S32) and if the photographing is accepted (step S32, YES), the image processing server 6 is notified that the photographing is accepted (step S33). After this notification, it is determined whether or not the termination signal is received from the image processing server 6 (step S34), if the termination signal is not received (step S34, NO), the URL of the image display Web is received from the image processing server 6 (step S35).

In the cellular phone 42, after adjustments are performed for the photographing conditions such as the position of the camera unit 20, the position of the object, brightness, etc., the photographing is performed (step S36). Along with the image acquired in this photographing, the photographing information representing the photographing conditions such as the image brightness and focal distance is transmitted to the image processing server 6 (step S37).

As described above, the image processing server 6 is notified of the photographing information along with the image from the cellular phone 42 and is also notified of the images and the information from the cellular phone 41, the cellular phone 43 accepting the photographing, etc.; the image composition is performed to overlay the images on the template; and the composite image is displayed on the image display Web. The image adjustment process is as described above.

In the cellular phone 42, it is checked whether the composite image displayed on the image display Web is good or not (step S38), and if the composite image is corrected (step S38, NO), the processes of steps S36, S37 are repeated to make the image processing server 6 correct the composite image. If the composite image is accepted (step S38, YES), the OK signal is transmitted from the cellular phone 42 to the image processing server 6 to instruct to fix the image (step S39). The OK signal is transmitted and notified to the image processing server 6 by pressing down, for example, the decision key 17 in the key input unit 18 of the cellular phone 42.

The composite image displayed on the image display Web is stored in the cellular phone 42 through the storing operation (step S40). The storage of the image is performed at the discretion of the accepter and if the image process is terminated, the termination signal is transmitted from the cellular phone 42 to the image processing server 6 (step S41) to terminate the image process.

If the photographing is not accepted (step S32, NO), the refusal of the photographing is notified from the cellular phone 42 to the image processing server 6 (step S42) and the image process is terminated as well.

Figure 8:
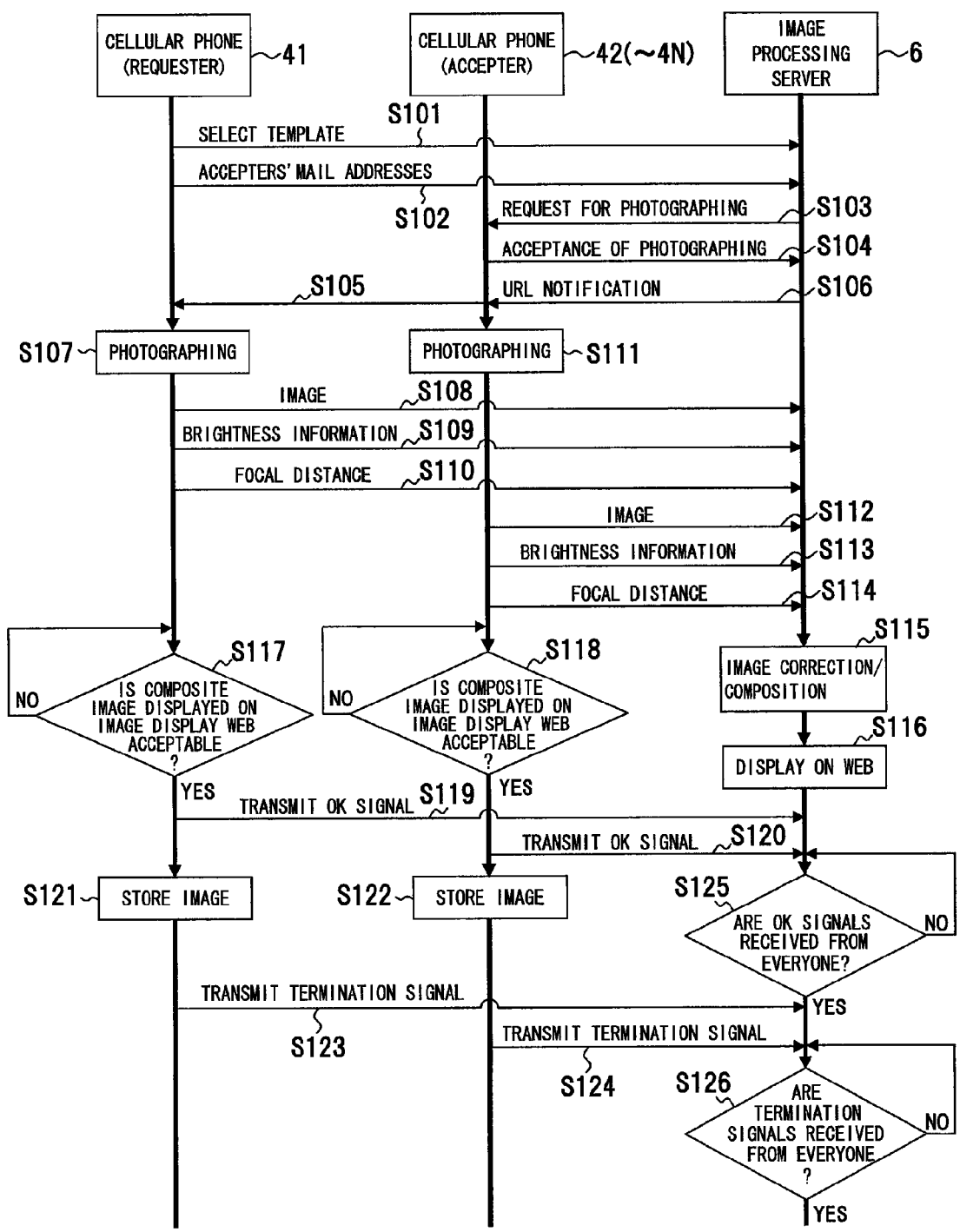
FIG. 8 shows a process sequence of image composition in the image processing server and each cellular phone.

The image processing method will be described with reference to FIG. 8. FIG. 8 shows a process sequence of the image composition in the image processing server and each cellular phone. In FIG. 8, the same symbols are added to the portions corresponding to those of FIG. 1.

In this process sequence, the cellular phone 41 is assumed to be the requester and the cellular phones 42 to 4N are assumed to be the accepters.

In this case, performed are the selection of the template (step S101) and the notification of the accepters' mail addresses (step S102) from the cellular phone 41 to the image processing server 6, and the image processing server 6 notified of the mail addresses requests the cellular phones 42 to 4N to photograph an image (step S103). The notification of the acceptance of the photographing (step S104) is transmitted to the image processing server 6 from all or some of the cellular phones 42 to 4N accepting the request for the photographing. In response to this notification, the image processing server 6 performs the notification of the URL of the image display Web (step S105) to the cellular phone 41 along with the notification indicating that the photographing is accepted and also performs the notification of the URL of the image display Web (step S106) to the cellular phones 44 to 4N.

The cellular phone 41 performs the photographing (step S107) and transmits the image and the photographing information such as the brightness information and the focal distance of the image to the image processing server 6 (steps S108, S109, and S110). The accepters' cellular phones 42 to 4N also perform the photographing (step S111) and transmit the images and the photographing information such as the brightness Information and the focal distances of the images to the image processing server 6 (steps S112, S113, and S114).

The image processing server 6 receives the images and the photographing information and performs the image correction and the image composition (step S115) to display the composite image on the image display Web (step S116). The displayed image can be checked by the cellular phone 41 and the cellular phones 42 to 4N. In the cellular phone 41, it is determined whether the composite image displayed on the image display Web is good or not (step S117); similarly, the determination is performed in the cellular phones 42 to 4N (step S118); if the correction of the image is needed, the image correction is performed with the cellular phones 41 to 4N and the image processing server 6; and if the correction of the image is not needed, the OK signal is notified from the cellular phone 41 to the image processing server 6 (step S119); and similarly, the OK signals are notified from the cellular phones 42 to 4N to the image processing server 6 (step S120).

In the cellular phone 41 and the cellular phones 42 to 4N, the image is stored (steps S121 and S122), and respective termination signals are transmitted to the image processing server 6 (steps S123 and S124). The image processing server 6 monitors the reception of the OK signals from everyone (step S125), monitors the reception of the termination signals (step S126) after the OK signals are received, and terminates the image composition process when the termination signals are received.

Figure 9:
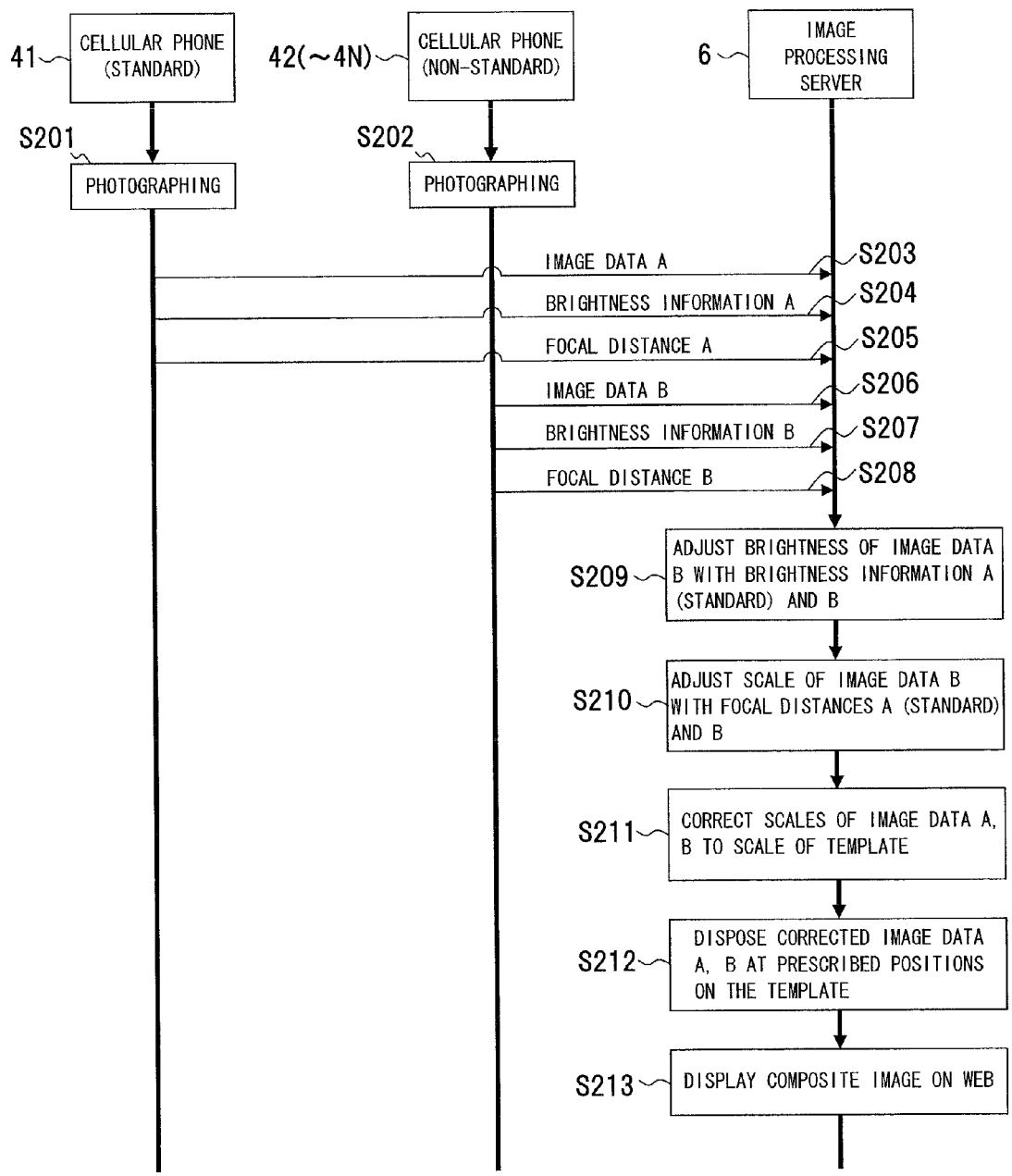
FIG. 9 shows a process sequence of image correction.

The image correction in the image processing server will be described with reference to FIG. 9. FIG. 9 shows a process sequence of the image correction.

In this case, the information from the cellular phone 41 of the requester is a standard and the information from the cellular phones 42 to 4N of the accepters is a non-standard. The photographing with the cellular phone 41 (step S201) and the photographing with the cellular phones 42 to 4N (step S202) are performed; the cellular phone 41 transmits to the image processing server 6 image data A representing an image and the photographing information, i.e., brightness information A and the cellular phones 42 to 4N transmit to the image processing server 6 image data B representing images and the photographing information, i.e., brightness information B and focal distances B (steps S206, S207, and S208).

The image processing apparatus, i.e., the image processing server 6 adjusts the brightness of the image data B based on the brightness information A, B (step S209), corrects the scale of the image data B based on the focal distances A, B (step S210), corrects the scales of the image data A, B correspondingly to the size of the template (step S211), disposes the corrected image data A, B at prescribed positions on the template (step S212), and display the composite image on the image display Web (step S213).

The image composition will be described with reference to FIGS. 10A to 10D, 11A to 11E, 12A to 12C, and 13A to 13C. FIGS. 10A to 10D show an example of the image composition and FIGS. 11A to 11E, 12A to 12C, and 13A to 13C show other examples of the image composition.

Figure 10A:
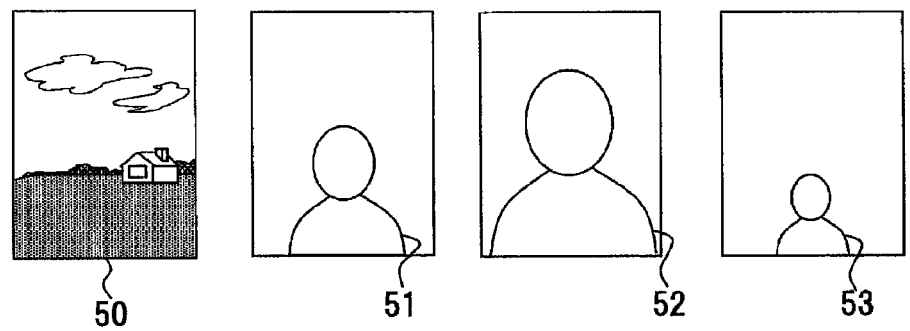
FIGS. 10A, 10B, 10C, and 10D show an example of image process and image composition.

In the image composition, as shown in FIG. 10A, the template 50 is selected through the communication between the cellular phone 41 (requester) and the image processing server 6 and the image processing server 6 is notified of the photographing information such as a focal distance and brightness along with an image 51 in a photographing process from the cellular phone 41. Similarly, through the communication between each of the cellular phones 42, 43 and the image processing server 6, the accepters notify the image processing server 6 of the photographing information such as focal distances and brightness along with an image 52 in a photographing process from the cellular phone 42 and an image 53 in a photographing process from the cellular phone 43.

Figure 10B:
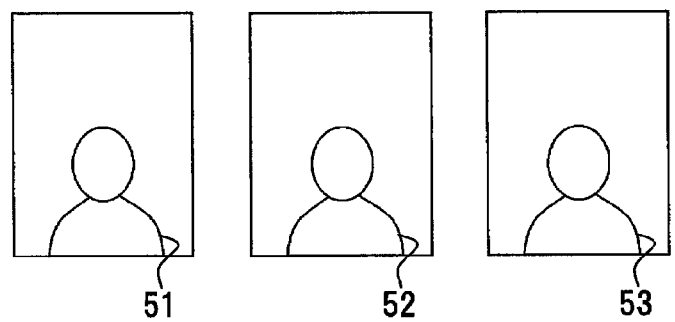
Figure 10C:
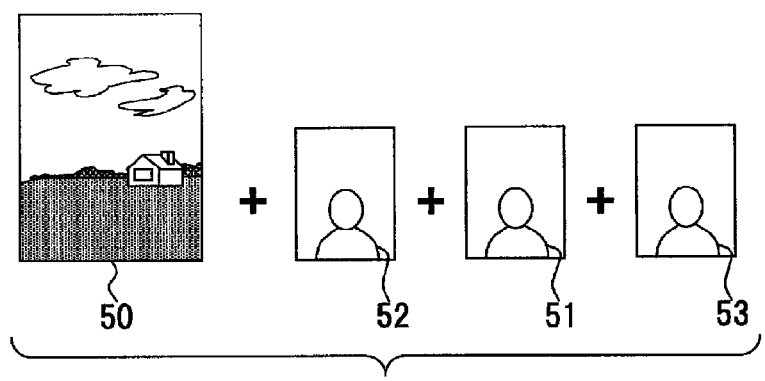
Figure 10D:
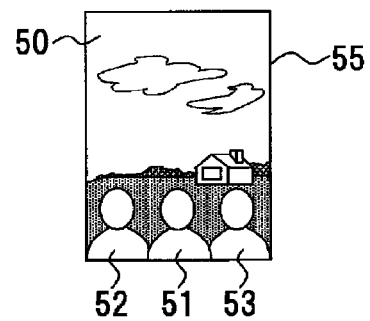

As shown in FIG. 10B, the image processing server 6 scales the images 52, 53 based on the photographing information associated with the image 51 and corrects the scales of images 51 to 53 correspondingly to the size of the template, and after the location of each image 51 to 53 is corrected to the prescribed position as shown in FIG. 10C, each image 51, 52, 53 is combined with the template 50 to acquire a composite image 55 as shown in FIG. 10D. This composite image 55 is displayed on the aforementioned image display Web, i.e., at the URL representing the location of the image processing server 6 and the composite image on the network 8. The composite image 55 is checked through the access from the cellular phones 41, 42, 43 participating in the image composition.

By the way, the image adjustment such as the scale correction may be performed in the cellular phones 42, 43 by checking the composite image 55 through the communication between the cellular phones 41, 42, 43 and the image processing server 6, and retransmission may be performed from the cellular phones 42, 43. That is, for example, the focal distance is corrected by correcting the accepters' images 52, 53 based on the requester's image 51 or by requesting the transmission of a rephotographed image. In this case, the image processing server 6 may scale the images to achieve the consistency of the size.

The composite image 55 is also deployed on the aforementioned image display Web, i.e., at the URL representing the location of the image processing server 6 and the composite image on the network 8, and if the requester or the accepter approves the composite image 55 based on the image check, the composite image 55 is fixed and registered by notifying the approval. The composite image 55 can be loaded to each cellular phone 41, 42, 43 from the URL.

Since the images 51 to 53 in a photographing process can be corrected and combined in this way, the presentation, expression, etc. can be achieved beyond individual images such that the users participating in the image composition 55 can acquire the intended composite image, the composite image with uniformity, etc. Although the composite image 55 is different from the real images, i.e., the images 51 to 53, the image close to the real images can be acquired. Although the correction of the focal distance has been described, the brightness or the cropping such as extraction of a human figure on the image may be controlled. The standard image is not fixed to the requester's image and the accepter's image may be used, of course.

Figure 11A:
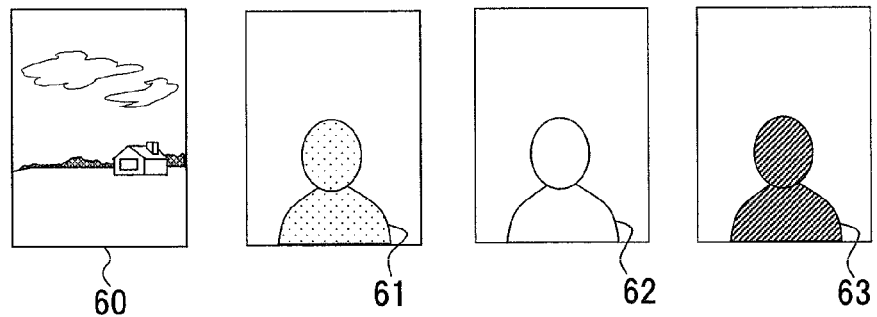
FIGS. 11A, 11B, 11C, 11D, and 11E show another example of image process and image composition.
Figure 11B:
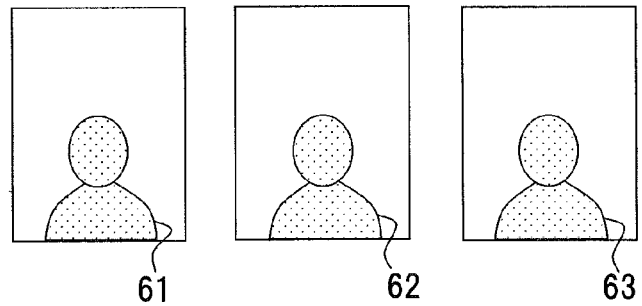
Figure 11C:
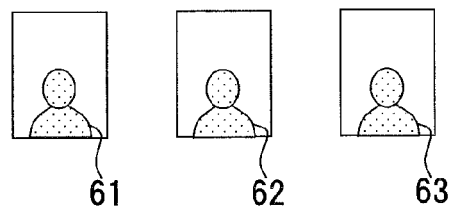
Figure 11D:
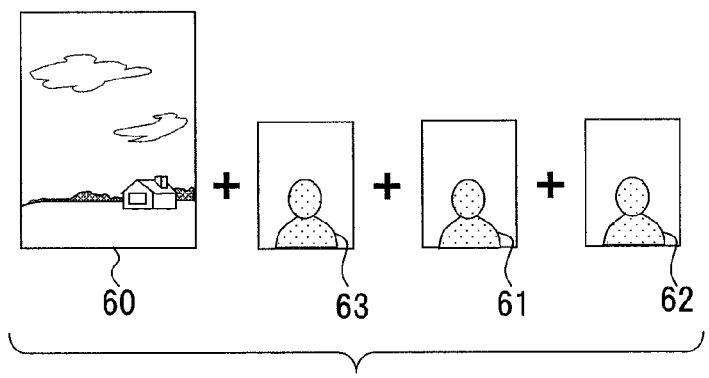
Figure 11E:
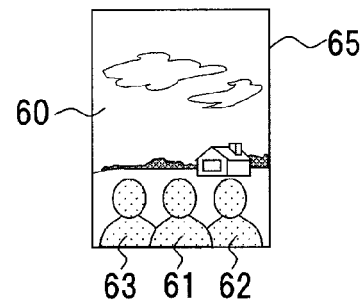

As shown in FIG. 11, when a template 60 is selected in the image processing server 6 and an image 61 is transmitted from the cellular phone 41, for example, if an image 62 and an image 63 are transmitted from the cellular phone 42 and the cellular phone 43, respectively, in the image composition and correction process, the brightness of the images 62, 63 are adjusted based on the image 61 as shown in FIG. 11B, and the scales of the image 61, 62, 63 are corrected in conformity with the template 60 as shown in FIG. 11C. The corrected images 61, 62, 63 are disposed at the prescribed locations of the template 60 as shown in FIG. 11D, and the corrected images 61, 62, 63 are combined with the template 60 to acquire a composite image 65 as shown in FIG. 11E. As a result, the composite image 65 conforms to the template 60 and has uniformity. The composite image 65 is displayed on the image display Web.

Figure 12A:
FIGS. 12A, 12B, and 12C show another example of image process and image composition.
Figure 12B:
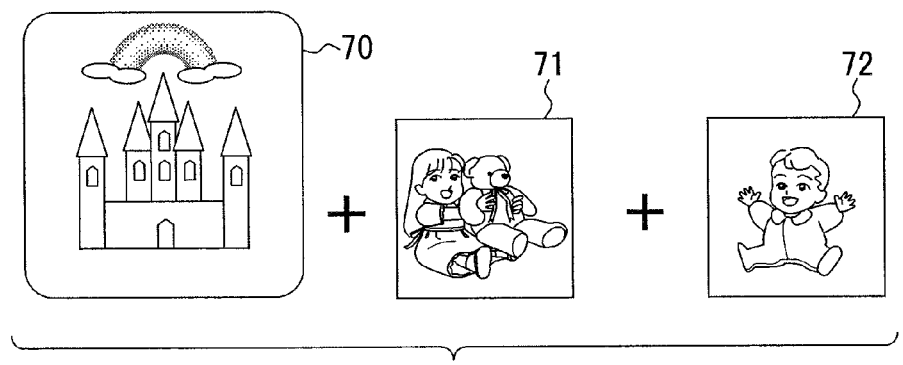
Figure 12C:
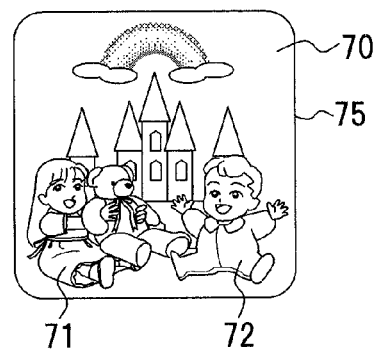

As shown in FIG. 12A, when a template 70 is selected in the image processing server 6 and an image 71 is transmitted from the cellular phone 41, for example, if an image 72 is transmitted from the cellular phone 42, in the image composition and correction process, the scales of the image 71, 72 are corrected in conformity with the template 70 as shown in FIG. 12B, and the corrected images 71, 72 are disposed at the predetermined locations of the template 70 and are combined as shown in FIG. 12C to acquire a composite image 75. The composite image 75 conforms to the template 70 and has uniformity. The composite image 75 is displayed on the image display Web.

Figure 13A:
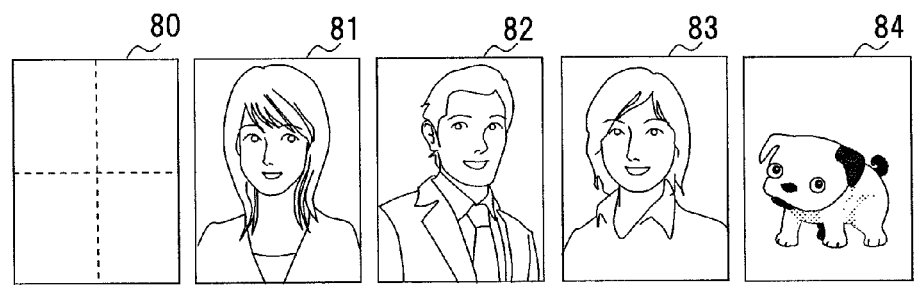
FIGS. 13A, 13B, and 13C show another example of image process and image composition.
Figure 13B:
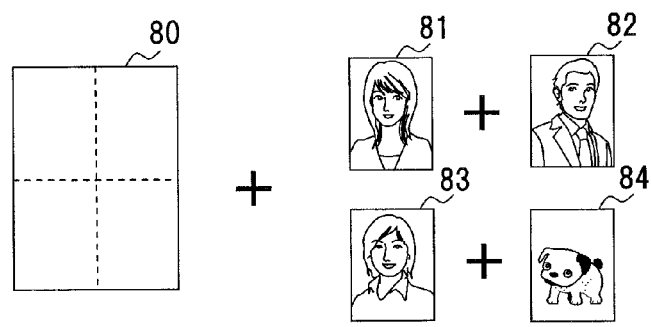
Figure 13C:
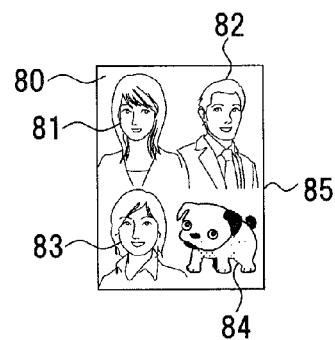

Various forms of templates can be used. As shown in FIG. 13A, when a four-part split displaying template 80 is selected and an image 81 is transmitted from the cellular phone 41, for example, if an image 82, an image 83 and an image 84 are transmitted from the cellular phone 42, the cellular phone 43 and the cellular phone 44, respectively, in the image composition and correction process, after the scales of the image 81, 82, 83, 84 are corrected in conformity with the predetermined locations of the template 80 as shown in FIG. 13B, the images 81 to 84 are combined with the template 80 as shown in FIG. 13C to acquire a composite image 85. The composite image 85 conforms to the template 80 and has uniformity. The composite image 85 is displayed on the image display Web.

Figure 14:
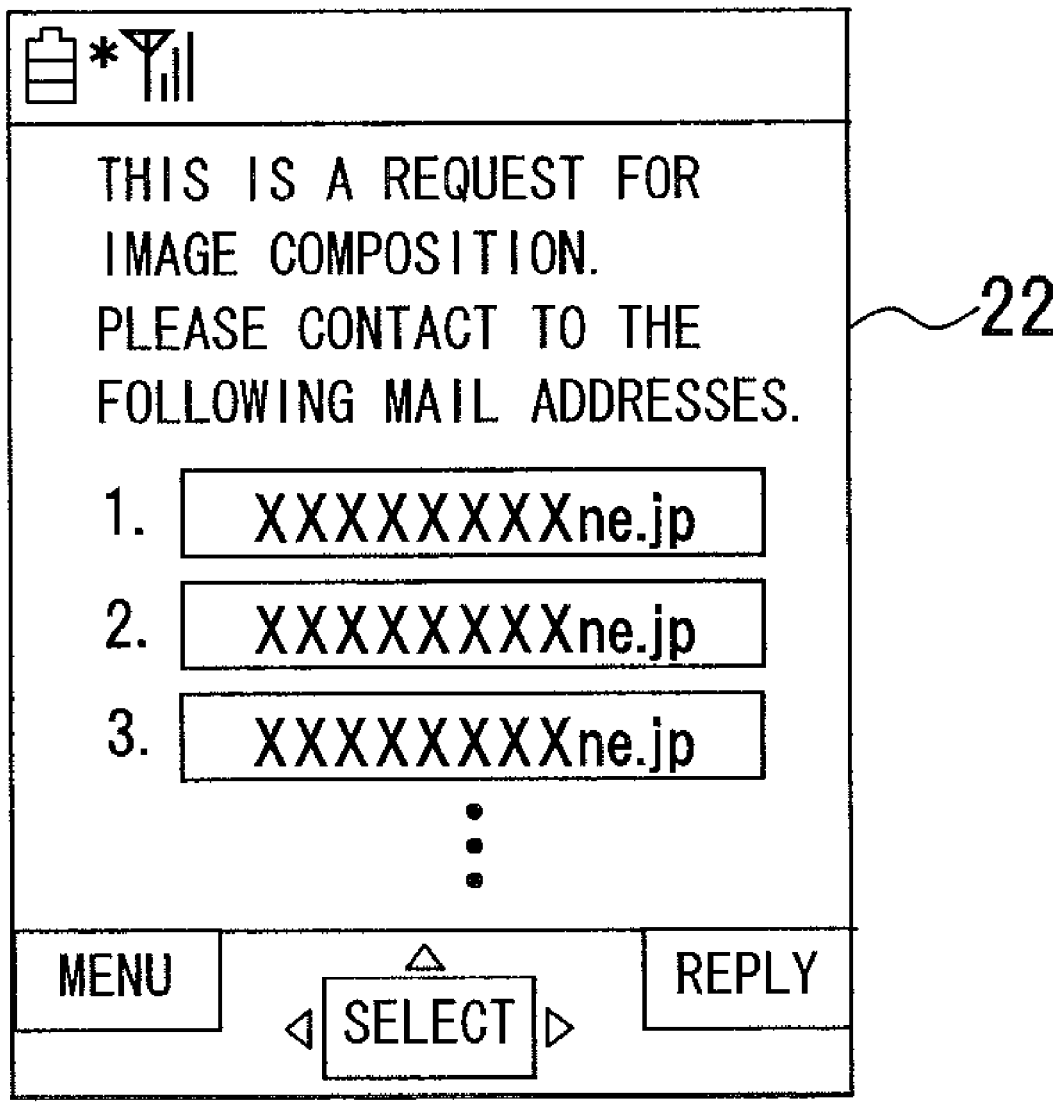
FIG. 14 shows a display screen at the time of a request for image composition.
Figure 15:
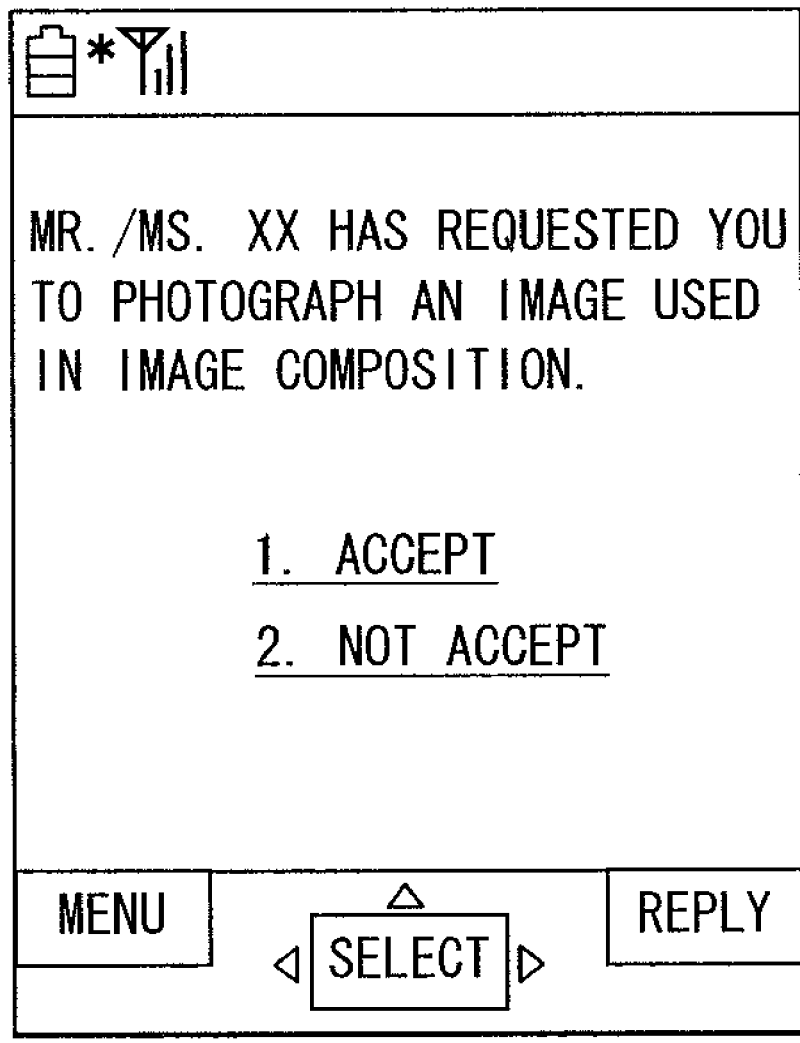
FIG. 15 shows a display screen that elicits participation in image composition.
Figure 16:
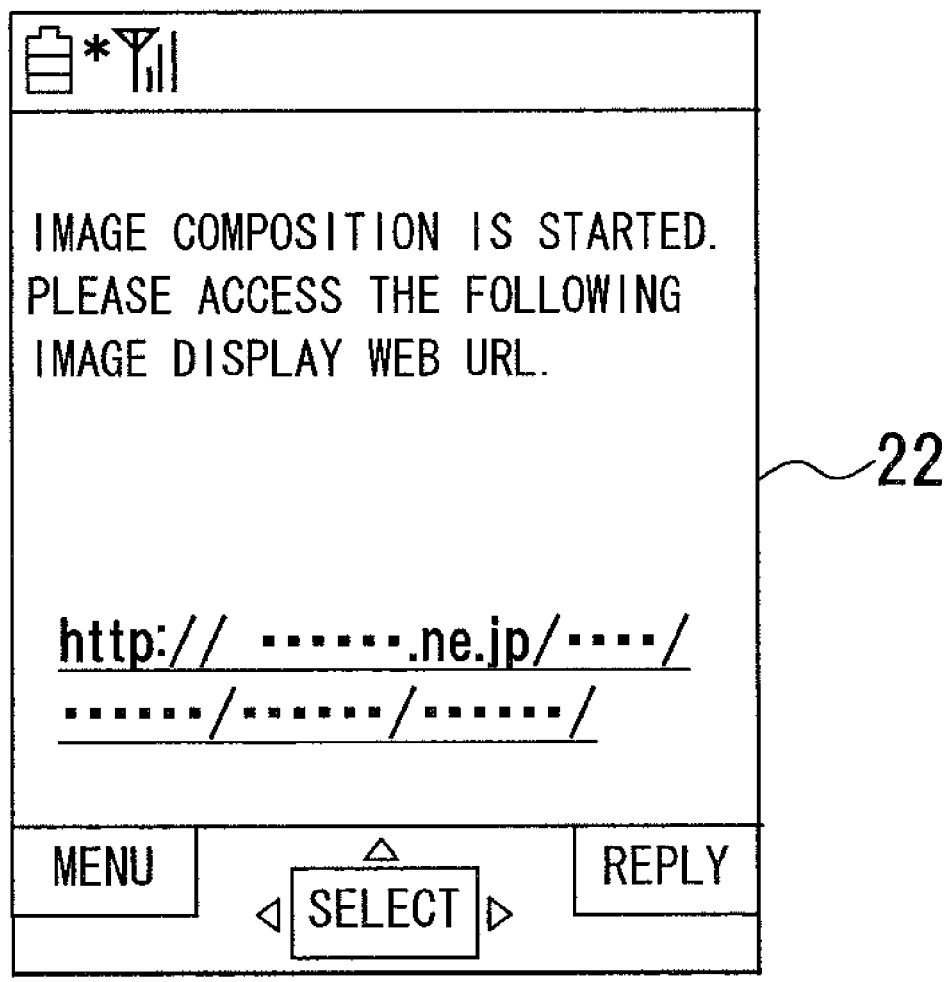
FIG. 16 shows a display screen at the time of notification of URL.
Figure 17:
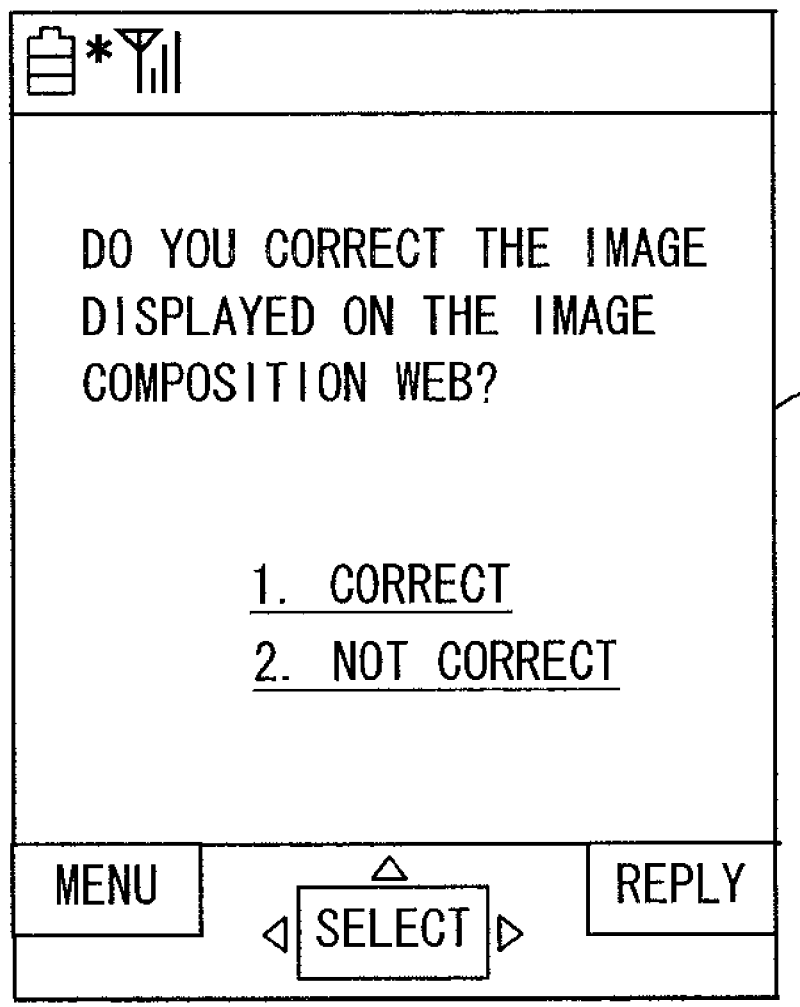
FIG. 17 shows a display screen when confirming correction of composite image.

Description will be made of the display screen of the cellular phone with reference to FIGS. 14 to 17. FIG. 14 shows a display screen at the time of the request for the image composition; FIG. 15 shows a display screen that elicits participation in the image composition; FIG. 16 shows a display screen at the time of the notification of URL; and FIG. 17 shows a display screen when confirming the correction of the composite image.

When the request for the image composition is issued from the cellular phone 41 to the image processing server 6, the display 22 displays an image composition request message and input mail addresses or mail addresses retrieved from a telephone directory. In this display, as shown in FIG. 14,
"this is a request for image composition.
Please contact to the following mail addresses.
1. XXXXXXXXne.jp
2. XXXXXXXXne.jp
3. XXXXXXXXne.jp
.
.
."

is displayed and this is notified to the image processing server 6.

With regard to this inquiry, the image processing server 6 sends an inquiry about participation in the image composition along with the notification of the requester to, for example, the cellular phone 42 of the accepter, and as shown in FIG. 15,
"Mr./Ms. XX has requested you to photograph an image used in image composition.
1. Accept
2. Not accept"

is displayed on the display 22. When "Accept" is selected, this triggers the start of the image composition process.

When the image composition is started, the notification of the URL of the image display Web is transmitted to the requester and the accepter, along with the notification of the start of the image composition. That is, as shown in FIG. 16,
"Image composition is started.
Please access the following image display Web URL.
http:// . . . ne.jp/ . . . / . . . /"

is displayed on the displays 22 of the cellular phones 41, 42.

After a predetermined time has passed from when the composite image can be checked as a result of the image composition, the image processing server 6 sends an inquiry about the correction of the composite image. In this case, as shown in FIG. 17,
"Do you correct the image displayed on the image composition Web?
1. Correct
2. Not correct"

is displayed on the displays 22 of the cellular phones 41, 42. "Correct" is selected when the image will be corrected and "Not correct" is selected when the image will not be corrected. When the image will not be corrected, the composite image will be photographed and loaded into the storing unit 28 by pressing down the shutter assigned to the decision key 17. The shutter key may be provided in addition to the decision key 17 and that key may be pressed down.

As described above, the image composition process can be performed as defined in the procedure by following the display on the screen and the desired composite image can be easily created and loaded.

With regard to the first embodiment described above, since the images photographed by a plurality of the cellular phones 41 to 4N are combined on the image processing server 6 in the image process, the operation of the composition process 75, 85 is displayed on the cellular phones 41 to 4N of the requester or the accepters before determining the images (i.e., before photographing), the photographed objects or the images can be easily adjusted and the images satisfying the users can be photographed.

More particularly, with regard to the process result, the real-time images sent from the cellular phones 41 to 4N are combined on the image processing server 6 and the composite image is distributed to the cellular phones 41 to 4N. The user of each cellular phone 41 to 4N checks and stores the composite image. To equalize the brightness and the direction (e.g., amount of sunlight) in the composite image, by feeding back the information from the image processing server 6 to each cellular phone 41 to 4N and by using this information to correct the images, the uniformity can be acquired in all the images collected for the composite image. The information from the image processing server 6 is also fed back to set the size of the object to an actual scale. In this way, the composite image equivalent to the real photographed images can be acquired. In the feedback process from the image processing server 6, the image processing server 6 may be supplied with specific information, i.e., information for presentation, for example, information indicating that the sun is located to the right of the photographed image or information of the height of the object, and the image may be corrected with reference to this information. As described above, since the images sent from the cellular phones 41 to 4N are corrected through the image processing server 6 playing a role of a relay station, each user's request can be reflected and the image can be easily corrected in response to the request to acquire the composite image closer to reality.

The advantages of the image process of the first embodiment are listed as follows.

(1) Since the composite image can be acquired from a plurality of provided images and the provided images are corrected depending on the composite image that should be acquired, the optimization of the composite image can be achieved.

(2) Since the image control information is supplied to the image provider depending on the composite image to control the focal distances, the image brightness, colors, etc. of the provided images, each image is coordinated and the uniform composite image can be acquired.

Second Embodiment

Figure 18:
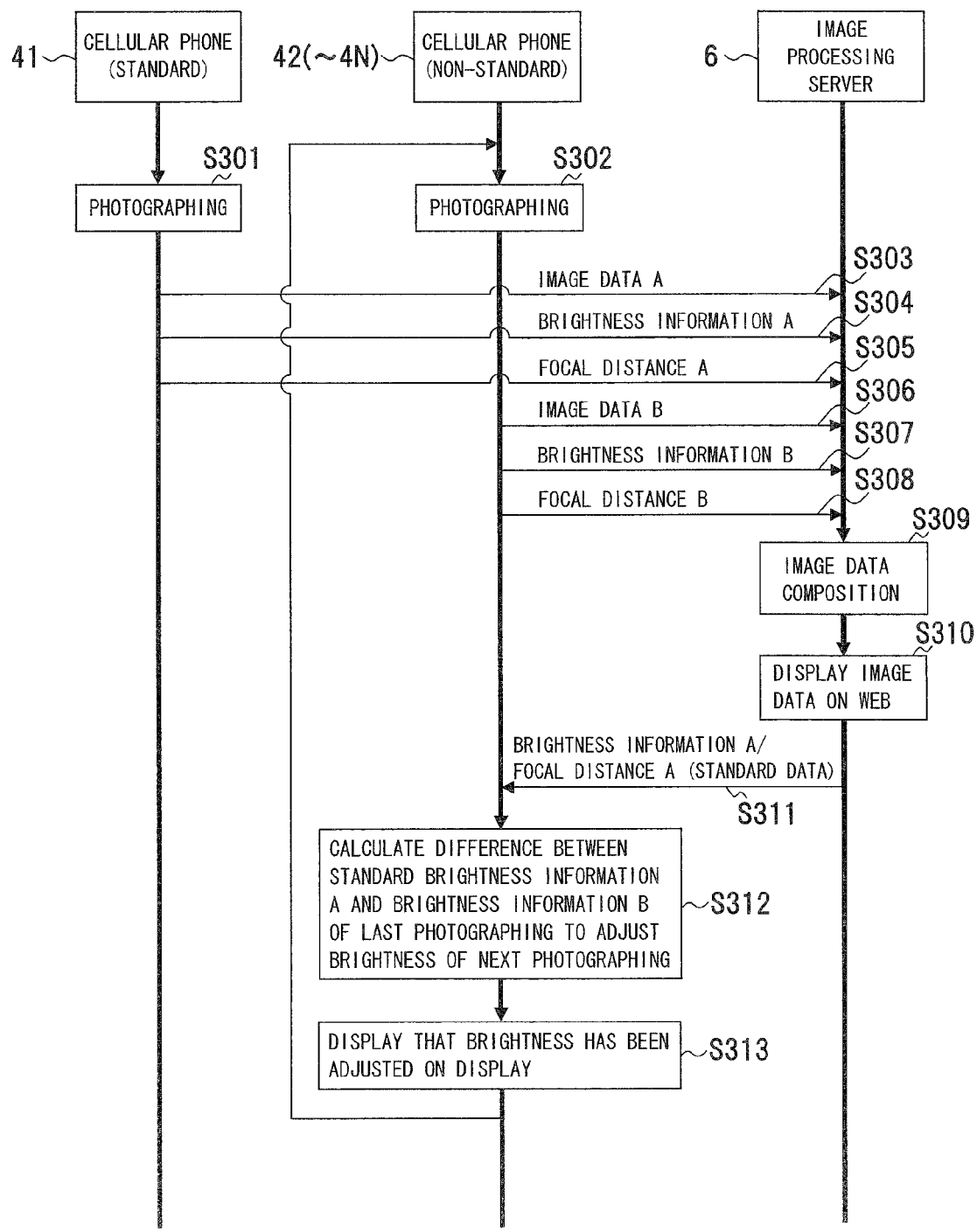
FIG. 18 shows a process sequence of an image processing method according to a second embodiment.

Description will be made of an image processing method according to a second embodiment with reference to FIG. 18. FIG. 18 shows a process sequence of brightness adjustment of a composite image. In FIG. 18, the same symbols are added to the portions corresponding to those of FIG. 1.

In this embodiment, the image processing system shown in FIG. 1, the cellular phones shown in FIGS. 2 and 3, the image processing server shown in FIG. 4, etc. are used, and the uniformity of the brightness of the composite image is achieved by adjusting the image brightness of the cellular phone 42 (to 4N) based on the image from the cellular phone 41.

Through the photographing with the cellular phone 41 (step S301) and the photographing with the cellular phone 42 (step S302), brightness information A and a focal distance A are transmitted as standard data along with image data A from the cellular phone 41 to the image processing server 6 (steps S303, S304, and S305), and brightness information B and a focal distance B are transmitted along with image data B from the cellular phone 42 to the image processing server 6 (steps S306, S307, and S308).

The image processing server 6 performs image data composition (step S309) and the image data representing the composite image is displayed on the image display Web (step S310) The composite image can be viewed by accessing from the cellular phones 41, 42, and if the composite image is corrected, the standard information, i.e., the brightness information A and the focal distance A are transmitted from the image processing server 6 to the cellular phone 42 (step S311). The cellular phone 42 performs the brightness adjustment that is the image adjustment process (step S312) and in this brightness adjustment process, a difference is calculated between the standard brightness information A and the brightness information B of the last photographing to adjust the brightness of the next photographing. After the brightness adjustment, the display 22 displays that the brightness has been adjusted (step S313). After checking the brightness, the procedure goes back to step S302 and the photographing is performed by pressing down the shutter key.

Third Embodiment

Figure 19:
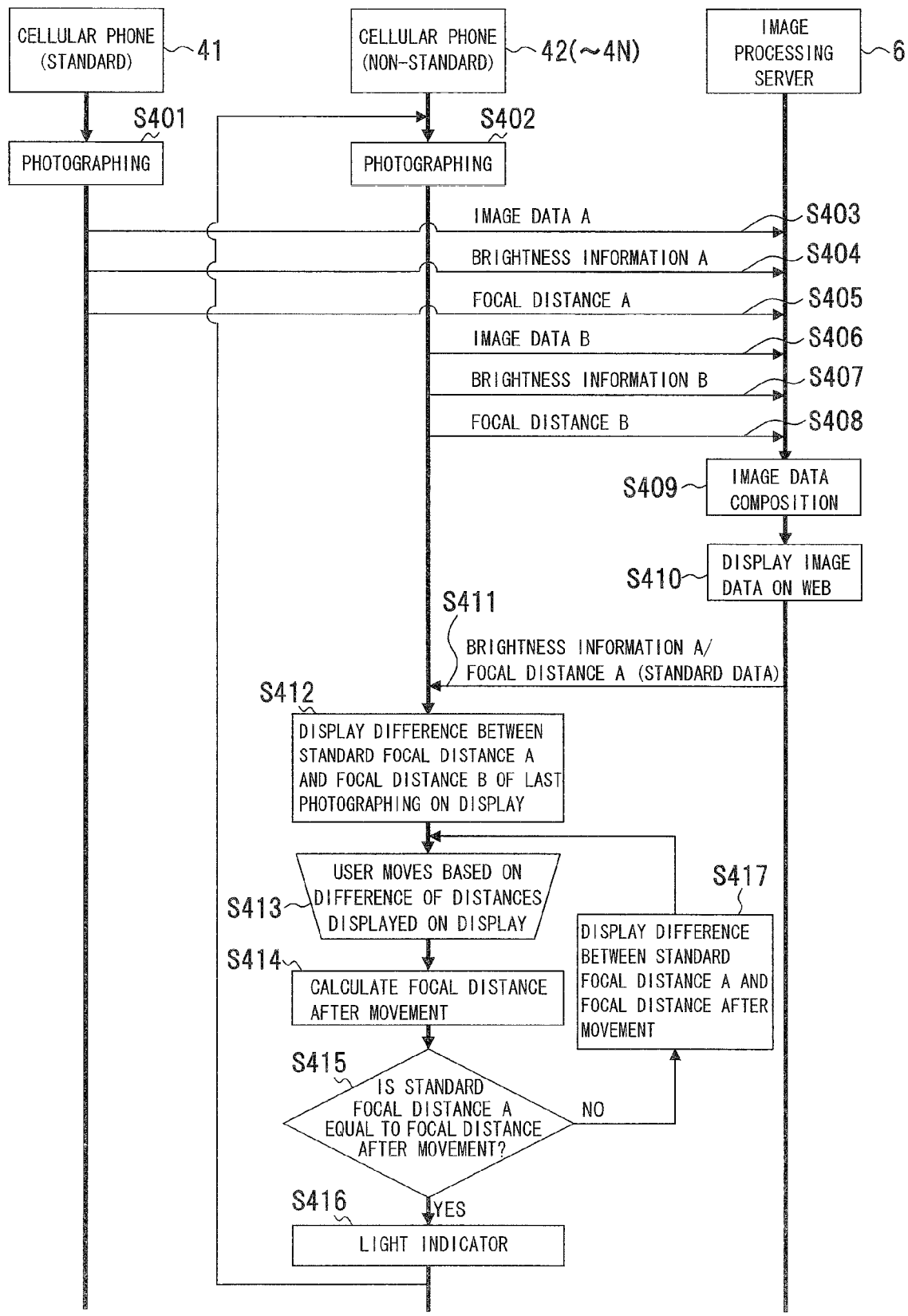
FIG. 19 shows a process sequence of an image processing method according to a third embodiment.

Description will be made of an image processing method according to a third embodiment with reference to FIG. 19. FIG. 19 shows a process sequence for a focal distance of a composite image. In FIG. 19, the same symbols are added to the portions corresponding to those of FIG. 1.

In this embodiment, the image processing system shown in FIG. 1, the cellular phones shown in FIGS. 2 and 3, the image processing server shown in FIG. 4, etc. are used, and the uniformity of the composite image is achieved by adjusting the focal distance of the cellular phone 42 (to 4N) based on the focal distance from the cellular phone 41.

Through the photographing with the cellular phone 41 (step S401) and the photographing with the cellular phone 42 (step S402), brightness information A and a focal distance A are transmitted as standard data along with image data A from the cellular phone 41 to the image processing server 6 (steps 403, S404, and S405), and brightness information B and a focal distance B are transmitted along with image data B from the cellular phone 42 to the image processing server 6 (steps S406, S407, and S408).

The image processing server 6 performs image data composition (step S409) and the image data representing the composite image is displayed on the image display Web (step S410) The composite image can be viewed by accessing from the cellular phones 41, 42, and if the composite image is corrected, the standard information, i.e., the brightness information A and the focal distance A are transmitted from the image processing server 6 to the cellular phone 42 (step S411). The cellular phone 42 performs the focal distance adjustment process that is the image adjustment process (steps S412 to S416).

In the focal distance adjustment process, a difference is calculated between the standard focal distance A and the focal distance B of the last photographing and is displayed on the display 22 (step S412), and a user, i.e., a photographer moves based on the focal distance displayed on the display 22 (step S413) to change the distance to the object. The focal distance after the movement is calculated from the image (step S414); it is determined whether or not the focal distance after the movement is equal to the standard focal point A (step S415); and if the focal distances are equal, the indicator 24 is lighted (step S416) or it is notified that the focal distances are identical.

If the focal distances are not identical, the display 22 displays a difference between the standard focal distance A and the focal distance after the movement (step S417); the procedure goes to step S413; and the photographer using the cellular phone 42 moves. By repeating such a process and operation until the focal distances become identical and by pressing down the shutter key at the position where the indicator 24 is lighted (step S416), the photographing is performed at the optimum focal position (step S402). The image and the photographing information are transmitted to the image processing server 6.

Fourth Embodiment

Description will be made of an image processing system according to a fourth embodiment of the present invention with reference to FIG. 20. FIG. 20 shows another image processing system.

In the image processing system 2, the communication terminal devices providing images used in the image composition are a personal computer (PC) 91, a cellular phone 92, a personal digital assistant (PDA) 93, a digital camera 94, etc. The PC 91, the cellular phone 92, and the PDA 93 includes a communication function and a photographing function and the digital camera 94 includes a communication function.

In such a configuration, as described in the first to third embodiments, in response to the appeal for the image composition from the communication terminal device, the image processing server 6 can perform an inquiry to the communication terminal devices at the registered addresses about the photographing, can combine a plurality of images with the selected template, and can perform various adjustments for the composite image. Therefore, the image photographing accepter only needs to include a communication function and an image provision function, and the accepter is not limited to a cellular phone.

Other Embodiment (1) Although the image control information has been the brightness and the focal distance that are information for correcting the image in the above embodiments, the image control information may be color strength, image size, zoom information, image quality, etc.

(2) Although the image adjustment has been performed by setting the cellular phone 41 as a standard and by setting other cellular phones 42 to 4N as non-standards in the above embodiments, the standard communication terminal device may be other than the cellular phone 41.

(3) Although the composite image has been created by capturing the images in a photographing process in the above embodiments, the composite image may be created using photographed images or images acquired by other than photographing.

(4) Although the communication terminal device and the image processing server 6 are linked through the network 8 in the above embodiments, the network 8 may be private network other than public line network and may be wired or wireless network. A communication medium may be the electric waves in the Bluetooth standard.

As described above, according to the present invention, the composite image can be created in real time with the use of a plurality of images provided from the communication terminal devices including a photographing function and the template in the image processing server such as a background image and the composite image can be corrected with the use of the image control information to acquire the composite image with high uniformity that satisfies both the requester of the image composition and the image provision acceptor.

Although the most preferred embodiments of the present invention have been described hereinabove, the present invention is not intended to be limited to the above description and various modifications and alterations can be naturally achieved by those skilled in the art based on the gist of the present invention as defined in the appended claims or disclosed in the specification; and it is needless to say that such modifications and alterations are encompassed within the scope of the present invention.

What is claimed is:

1. A communication terminal device that provides an image used in image composition, comprising:
   an image acquiring unit to acquire the image used in the image composition;
   a communicating unit to notify an image processing server combining images of address information of a communication terminal device that is an acceptor accepting to provide an image necessary for the image composition, the communicating unit to transmit the image acquired by the image acquiring unit and image control information that includes brightness information and focal distance of the image; and
   an image processing unit to adjust the image by photographing the image based on adjusted brightness or focal distance of the image, the adjusted brightness or focal distance of the image being adjusted based on brightness information or focal distance information of an image provided from the image processing server, the brightness information or the focal distance information being included in image control information of the image provided from the image processing server, wherein
   the adjusted image is transmitted to the image processing server through the communicating unit.

2. The communication terminal device of claim 1, further comprising:
   a display unit displaying that the image conforms to the image control information provided from the image processing server, when the image conforms to the image control information provided from the image processing server by adjusting of the image processing unit.

3. A communication terminal device comprising:
   a photographing unit to photograph an image used in image composition;
   a communicating unit to communicate with an image processing server performing the image composition to receive an inquiry about provision of the image necessary for the image composition from the image processing server, the communicating unit to notify the image processing server of information indicating whether or not the image can be provided, the communicating unit to transmit the image photographed by the photographing unit and image control information that includes brightness information and focal distance of the image to the image processing server in case where it is accepted to provide the image; and
   an image processing unit to adjust the image by photographing the image based on adjusted brightness or focal distance of the image, the adjusted brightness or focal distance of the image being adjusted based on brightness information or focal distance information of an image provided from the image processing server, the brightness information or the focal distance information being included in image control information of the image provided from the image processing server, wherein
   the adjusted image is transmitted to the image processing server through the communicating unit.

4. An image processing system that combines images, comprising:
   a first communication terminal device to issue a request for image composition, the first communication terminal device to notify address information of an acceptor of image provision;
   a second communication terminal device to accept an inquiry about the image provision to transmit an image; and
   an image processing server to receive the request for the image composition from the first communication terminal device and to register the notified address information, the image processing server to transmit the inquiry about the image provision to the second communication terminal device with the use of the address information, the image processing server to receive images and image control information transmitted from the first and the second communication terminal devices, the image processing server to create a composite image with the use of the images, wherein
   one of the first and the second communication terminal devices is set as a standard communication terminal device and the other thereof is set as a non-standard communication terminal device,
   the image processing server to transmit image control information of the standard communication terminal device to the non-standard communication terminal device,
   the non-standard communication terminal device to correct photographing conditions based on a difference calculated between the image control information of the standard communication terminal device and image control information of the last photographing, to photograph an image under the photographing conditions corrected and to transmit the image photographed under the photographing conditions corrected to the image processing server, and the image processing server to create the composite image combined with the image of the standard communication terminal device with the use of the image photographed under the photographing conditions corrected from the non-standard communication terminal device and to provide the composite image for the first and the second communication terminal devices.

5. The image processing system of claim 4,
wherein the non-standard communication terminal device corrects brightness as the photographing conditions, based on a difference calculated between brightness information of the image control information of the standard communication terminal device and brightness information of the image control information of the last photographing.

6. An image processing method for combining images, comprising:

issuing a request for image composition device, and notifying address information of an acceptor of image provision, by a first communication terminal;

accepting an inquiry about the image provision to transmit an image by a second communication terminal device;

receiving the request for the image composition from the first communication terminal device and registering the notified address information, transmitting the inquiry about the image provision to the second communication terminal device with the use of the address information, receiving images and image control information transmitted from the first and the second communication terminal devices, and creating a composite image with the use of the images, by an image processing server;

setting one of the first and the second communication terminal devices as a standard communication terminal device and setting the other thereof as a non-standard communication terminal device;

transmitting image control information of the standard communication terminal device to the non-standard communication terminal device by the image processing server;

correcting photographing conditions based on a difference calculated between the image control information of the standard communication terminal device and image control information of the last photographing, photographing an image under the photographing conditions corrected and transmitting the image photographed under the photographing conditions corrected to the image processing server, by the non-standard communication terminal device; and creating the composite image combined with the image of the standard communication terminal device with the use of the image photographed under the photographing conditions corrected from the non-standard communication terminal device and providing the composite image for the first and the second communication terminal devices, by the image processing server.

* * * * *